(12) United States Patent
Baggerman

(10) Patent No.: US 11,094,031 B2
(45) Date of Patent: Aug. 17, 2021

(54) GPU RESOURCE USAGE DISPLAY AND DYNAMIC GPU RESOURCE ALLOCATION IN A NETWORKED VIRTUALIZATION SYSTEM

(71) Applicant: Nutanix, Inc., San Jose, CA (US)

(72) Inventor: Cornelis Hendrikus Baggerman, Den Dolder (NL)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/241,306

(22) Filed: Jan. 7, 2019

(65) Prior Publication Data
US 2019/0139185 A1  May 9, 2019

Related U.S. Application Data

(63) Continuation of application No. 15/463,830, filed on Mar. 20, 2017, now Pat. No. 10,176,550.

(51) Int. Cl.
*G06T 1/20* (2006.01)
*G06T 1/60* (2006.01)

(52) U.S. Cl.
CPC .......... *G06T 1/20* (2013.01); *G06T 1/60* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 10,163,152 B1* | 12/2018 | Ward, Jr. | G06Q 40/00 |
| 2002/0087611 A1* | 7/2002 | Tanaka | G06F 9/5077 718/1 |
| 2008/0115010 A1* | 5/2008 | Rothman | G06F 1/206 714/10 |

(Continued)

OTHER PUBLICATIONS

Non-Final Office Action dated Jul. 19, 2019 for related U.S. Appl. No. 15/492,860.

(Continued)

*Primary Examiner* — Patrick F Valdez
(74) *Attorney, Agent, or Firm* — Vista IP Law Group, LLP

(57) ABSTRACT

An architecture for implementing a mechanism for displaying GPU resource usage and dynamically allocating GPU resources in a networked virtualization system is provided. The mechanism compares an initial allocation of GPU resources to virtual machines supported by one or more nodes of the networked virtualization system to a current GPU resource usage by the virtual machines. Based at least in part on the comparison and workloads processed by the virtual machines, the mechanism may reallocate GPU resources to one or more of the virtual machines. A virtual machine is reassigned to a different vGPU profile if reassignment is likely to achieve a more efficient allocation of GPU resources to the virtual machine. A user interface indicating GPU resource usage relative to GPU resource allocation may also be generated and displayed.

39 Claims, 16 Drawing Sheets

(56) References Cited

U.S. PATENT DOCUMENTS

| | | | | |
|---|---|---|---|---|
| 2009/0265707 | A1* | 10/2009 | Goodman | G06F 9/5016 718/1 |
| 2010/0115510 | A1* | 5/2010 | Ford | G06F 9/5077 718/1 |
| 2013/0050246 | A1* | 2/2013 | Barry | G06F 11/301 345/593 |
| 2014/0176583 | A1 | 6/2014 | Abiezzi et al. | |
| 2014/0181806 | A1 | 6/2014 | Abiezzi et al. | |
| 2015/0277779 | A1* | 10/2015 | Devarapalli | G06F 9/45558 711/162 |
| 2015/0365349 | A1 | 12/2015 | Verma | |
| 2015/0371354 | A1 | 12/2015 | Petersen et al. | |
| 2015/0378764 | A1 | 12/2015 | Sivasubramanian et al. | |
| 2016/0147550 | A1* | 5/2016 | McWilliams | G06F 21/121 718/1 |
| 2016/0373588 | A1* | 12/2016 | Raleigh | H04M 15/61 |
| 2017/0075709 | A1* | 3/2017 | Feng | H04L 67/1097 |
| 2017/0185438 | A1* | 6/2017 | Thomas | G06F 9/45558 |
| 2018/0060996 | A1* | 3/2018 | Tunuguntla | G06T 1/20 |
| 2018/0130171 | A1* | 5/2018 | Prakash | G06F 9/5044 |

OTHER PUBLICATIONS

Cano, I. et al., "Curator: Self-Managing Storage for Enterprise Clusters", 14th USENIX Symposium on Networked Systems Design and Implementation, NSDI '17, (Mar. 27, 2017).

Notice of Allowance dated Nov. 4, 2019 for related U.S. Appl. No. 15/492,860.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Notice of Allowance dated Mar. 15, 2019 for related U.S. Appl. No. 15/492,860, 6 pages.

Non-Final Office Action dated Aug. 7, 2018 for related U.S. Appl. No. 15/492,860, 13 pages.

"Activity Monitor for mac: How to speed up macBook using Activity Monitor", Aug. 2, 2016, 4 pages.

Notice of Allowance dated Aug. 24, 2018 for related U.S. Appl. No. 15/463,830, 9 pages.

Ex-Parte Quayle Action dated Dec. 6, 2018 for related U.S. Appl. No. 15/492,860, 4 pages.

* cited by examiner

| Graphics Board | vGPU Profile | Frame Buffer (MB) | Max Displays per User | Max Resolution Per Display | Max Users Per Graphics Board | Use Case |
|---|---|---|---|---|---|---|
| A | A-1 | 8192 MB | 4 | 3840 x 2160 | 2 | High End Designer |
| A | A-2 | 4096 MB | 4 | 3840 x 2160 | 4 | Designer |
| A | A-3 | 2048 MB | 4 | 2560 x 1600 | 8 | Designer |
| A | A-4 | 1024 MB | 2 | 2560 x 1600 | 16 | Designer |
| A | A-5 | 512 MB | 2 | 2560 x 1600 | 32 | Power User / Designer |
| A | A-6 | 2048 MB | 2 | 2560 x 1600 | 8 | Power User |
| A | A-7 | 1024 MB | 2 | 2560 x 1600 | 16 | Power User |
| A | A-8 | 512 MB | 2 | 2560 x 1600 | 32 | Power User |
| Graphics Board | vGPU Profile | Frame Buffer (MB) | Max Displays per User | Max Resolution Per Display | Max Users Per Graphics Board | Use Case |
| B | B-1 | 8192 MB | 4 | 3840 x 2160 | 4 | High End Designer |
| B | B-2 | 4096 MB | 4 | 3840 x 2160 | 8 | Designer |
| B | B-3 | 2048 MB | 4 | 2560 x 1600 | 16 | Designer |
| B | B-4 | 1024 MB | 2 | 2560 x 1600 | 32 | Designer |
| B | B-5 | 512 MB | 2 | 2560 x 1600 | 64 | Power User / Designer |
| B | B-6 | 2048 MB | 2 | 2560 x 1600 | 16 | Power User |
| B | B-7 | 1024 MB | 2 | 2560 x 1600 | 32 | Power User |
| B | B-8 | 512 MB | 2 | 2560 x 1600 | 64 | Power User |

FIG. 2

| ▲ TYPE | HOST | MODE | vGPU PROFILE | USAGE | ALLOCATION |
|---|---|---|---|---|---|
| Graphics Board A | Host 001 | vGPU | 1/8 vGPU, 1GB Framebuffer | 78.5% | 7 of 8 VMs allocated |
| Graphics Board A | Host 004 | vGPU | 1/4 vGPU, 2GB Framebuffer | 92.1% | 4 of 4 VMs allocated |
| Graphics Board B | Host 001 | vGPU | 1/2 vGPU, 4GB Framebuffer | 98.0% | 4 of 4 VMs allocated |
| Graphics Board A | Host 003 | vGPU | 1/8 vGPU, 1GB Framebuffer | 71.8% | 8 of 8 VMs allocated |

Summary ▷ Graphics Board A

GPU SUMMARY

| Type | Graphics Board A |
|---|---|
| Host | 001 |
| RAM per GPU | 8 GB |
| Cores per GPU | 640 |
| Mode | vGPU |
| vGPU Profile | 1/8 GPU, 1GB Framebuffer |
| Usage | 78.5% |
| Allocation | 7 of 8 VMs allocated |

Performance | VMs | Alerts | Events

GPU Usage — VM: 001A — Peak: 11.1%, Current: 11.1% — 1:00 PM, 2:00 PM, 3:00 PM — 452

ALERT: GPU usage of VM 001A exceeded threshold of 11%
TIME: 3:24 PM
ACTION(S): Reassign VM to Different vGPU Profile — Automatically / Manually
REASSIGNED HOST: ▼ Host 004
REASSIGNED PROFILE: ▼ 1/4 vGPU, 4GB Framebuffer

| Overview | Diagram | Table | | | |
|---|---|---|---|---|---|
| Host | Disk | Switch | GPU | | |

| ▲TYPE | HOST | MODE | vGPU PROFILE | USAGE | ALLOCATION |
|---|---|---|---|---|---|
| Graphics Board A | Host 001 | vGPU | 1/8 vGPU, 1GB Framebuffer | 78.5% | 7 of 8 VMs allocated |
| Graphics Board A | Host 004 | vGPU | 1/4 vGPU, 2GB Framebuffer | 92.1% | 4 of 4 VMs allocated |
| Graphics Board B | Host 001 | vGPU | 1/2 vGPU, 4GB Framebuffer | 98.0% | 4 of 4 VMs allocated |
| Graphics Board A | Host 003 | vGPU | 1/8 vGPU, 1GB Framebuffer | 71.8% | 8 of 8 VMs allocated |

Summary ▷ Graphics Board A — 460

| GPU SUMMARY | |
|---|---|
| Type | Graphics Board A |
| Host | 001 |
| RAM per GPU | 8 GB |
| Cores per GPU | 640 |
| Mode | vGPU |
| vGPU Profile | 1/8 GPU, 1GB Framebuffer |
| Usage | 78.5% |
| Allocation | 7 of 8 VMs allocated |

| Performance | VMs | Alerts | Events |
|---|---|---|---|

| EVENT: | DETAILS: | TIME: |
|---|---|---|
| Manual Reassignment | VM 001A reassigned to Host 004/vGPU profile 1/4 vGPU, 4GB Framebuffer | 3:26 PM |
| Alert Issued | GPU usage of VM 001A exceeded threshold of 11% | 3:24 PM |
| Alert Issued | 7 of 8 VMs allocated on Graphics Board A | 12:57 PM |

GPU RESOURCE USAGE DISPLAY AND DYNAMIC GPU RESOURCE ALLOCATION IN A NETWORKED VIRTUALIZATION SYSTEM

RELATED APPLICATIONS

The present application is a continuation application of U.S. patent application Ser. No. 15/463,830 titled, "GPU RESOURCE USAGE DISPLAY AND DYNAMIC GPU RESOURCE ALLOCATION IN A NETWORKED VIRTUALIZATION SYSTEM", filed on Mar. 20, 2017, which is hereby incorporated by reference in its entirety.

FIELD

This disclosure concerns a method, a computer program product, and a computer system for displaying GPU resource usage and dynamically allocating GPU resources in a networked virtualization system.

BACKGROUND

A networked virtualization system includes a number of nodes (e.g., hyperconverged systems that integrate compute and storage), in which each node services or "supports" a number of virtual machines and each node has local storage as well as cloud storage or networked storage. Some of the benefits of implementing virtualization include greater utilization of computing resources that would otherwise be wasted, lower operation costs, etc. For example, absent virtualization, only 10% of the CPU or memory of a physical server may be utilized by a single workload while the remaining 90% of resources are wasted. By adding a virtualization layer to the server, several virtual machines running multiple operating systems with different applications may be run simultaneously on the same server by sharing the physical resources of the server. The number of virtual machines that may be supported by a node is dependent on the workloads being handled by the virtual machines supported by the node and the node's resource capacity (e.g., memory, CPU, and scheduling limitations specific to the node). End users may experience degradation in performance when resources of a node that are utilized by virtual machines supported by the node begin to reach their capacity.

A type of resource that is often included in a node of a networked virtualization system is a GPU, or graphics processing unit (sometimes also referred to as a visual processing unit, or VPU). A GPU is a specialized electronic circuit that may be embedded on the motherboard, on the CPU die of a node, or on a graphics board/video card. Through the rapid altering and manipulation of memory, GPUs are designed to accelerate the generation of images in a buffer frame to be output on a display device. GPUs are generally more efficient than CPUs at image processing and manipulating computer graphics because they are capable of processing large blocks of data in parallel. Similar to the benefits afforded by the virtualization of other types of physical resources, the virtualization of physical GPU resources improves the efficiency with which they may be utilized.

GPU resources may be allocated to virtual machines based on the anticipated GPU resource requirements of each virtual machine. For example, suppose a first virtual machine is deployed to perform word processing tasks while a second virtual machine is deployed for playing video games. The second virtual machine will be allocated greater GPU resources than the first virtual machine since the tasks to be performed by the second virtual machine are more graphics-intensive than those to be performed by the first virtual machine. Thus, by way of virtualization, the resources on each physical GPU on a node may be partitioned to support a given number of virtual machines, in which the GPU resources are partitioned based on the anticipated GPU resource requirements of each virtual machine.

Unfortunately, when a user of a virtual machine switches tasks, the GPU resources previously allocated to their virtual machine may no longer suit their needs. For example, if a user decides to take a break from performing word processing tasks to play video games, the user may require additional GPU resources to be allocated to their virtual machine to adequately support the new workload. Failure to allocate these additional resources may result in performance degradation that negatively affects the user's experience (e.g., the user may experience choppy gameplay or the game may crash while the user is playing it). If the user in the above example decides to stop playing the video game and/or decides to resume the word processing tasks, the user's experience is not affected by having more GPU resources allocated to their virtual machine than are necessary for the word processing workload. However, the GPU resources allocated to the virtual machine may be wasted absent their reassignment by a system administrator (e.g., to another virtual machine that has insufficient GPU resources to process its current workload).

Various strategies exist to address the issues of under- and over-provisioning of GPU resources. For example, to address the issue of under provisioning of GPU resources, end users may be required to submit requests to allocate additional GPU resources, which may then be granted or denied by system administrators. However, requiring such requests to be submitted and reviewed by system administrators may be inconvenient and time-consuming for both the end users and system administrators. As an example of a strategy to address the issue of over-provisioning of GPU resources, system administrators may monitor fluctuations in the GPU resources used by virtual machines to determine when to deallocate GPU resources from a virtual machine and reallocate them to another virtual machine. However, such determinations may not always be accurate and may still result in over- or under-provisioning of GPU resources. Moreover, requiring system administrators to monitor the GPU resources (among other types of resources) used by hundreds or even thousands of virtual machines deployed on one or more clusters of nodes may be overwhelming and ultimately not feasible.

Therefore, there is a need to an improved approach for optimizing the allocation of GPU resources to virtual machines supported by nodes in a networked virtualization system.

SUMMARY

Embodiments of the present invention provide a method, a computer program product, and a computer system for displaying GPU resource usage and dynamically allocating GPU resources in a networked virtualization system.

According to some embodiments, a vGPU profile mechanism is implemented to evaluate an initial allocation of GPU resources to one or more virtual machines supported by a node of a networked virtualization system corresponding to a virtual GPU profile ("vGPU profile"). A vGPU profile indicates how virtualized resources of a physical GPU may be allocated to virtual machines supported by a node in which the physical GPU is located. Based on a comparison of the GPU resources used by the virtual machines and the GPU resources allocated to the virtual machines, the vGPU profile mechanism may reassign a virtual machine to a different vGPU profile and reallocate GPU resources to the virtual machine according to the vGPU profile to which the virtual machine is reassigned. The virtual machine is reassigned to a different vGPU profile if reassignment is likely to achieve a more efficient allocation of GPU resources to the virtual machine (i.e., GPU resources are reallocated to more closely match the GPU resource requirements of the workload of the virtual machine). The vGPU profile mechanism includes a workload classification module and a profile reassignment module. The workload classification module retrieves information describing the workload of a virtual machine, compares the information to that of predefined workload profiles, and classifies the workload based on the comparison. Using the classified workload of the virtual machine and one or more profile reassignment rules, the profile reassignment module of the vGPU profile mechanism may reassign a virtual machine to a different vGPU profile.

In some embodiments, a user interface indicating GPU resource usage also may be generated and displayed. The user interface may include one or more tables or graphical representations indicating GPU resource usage relative to GPU resource allocation (e.g., for a particular virtual machine, physical GPU, graphics board, node, etc.).

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 2 illustrates example tables for various vGPU profiles for different graphics boards according to some embodiments of the invention.

FIG. 4C illustrates an example user interface for presenting GPU resource-related alerts for each virtual machine supported by each graphics board on a node in a networked virtualization system according to some embodiments of the invention.

FIG. 4D illustrates an example user interface for presenting GPU resource-related events for each virtual machine supported by each graphics board on a node in a networked virtualization system according to some embodiments of the invention.

DETAILED DESCRIPTION OF THE EMBODIMENTS OF THE INVENTION

Figure 1A:
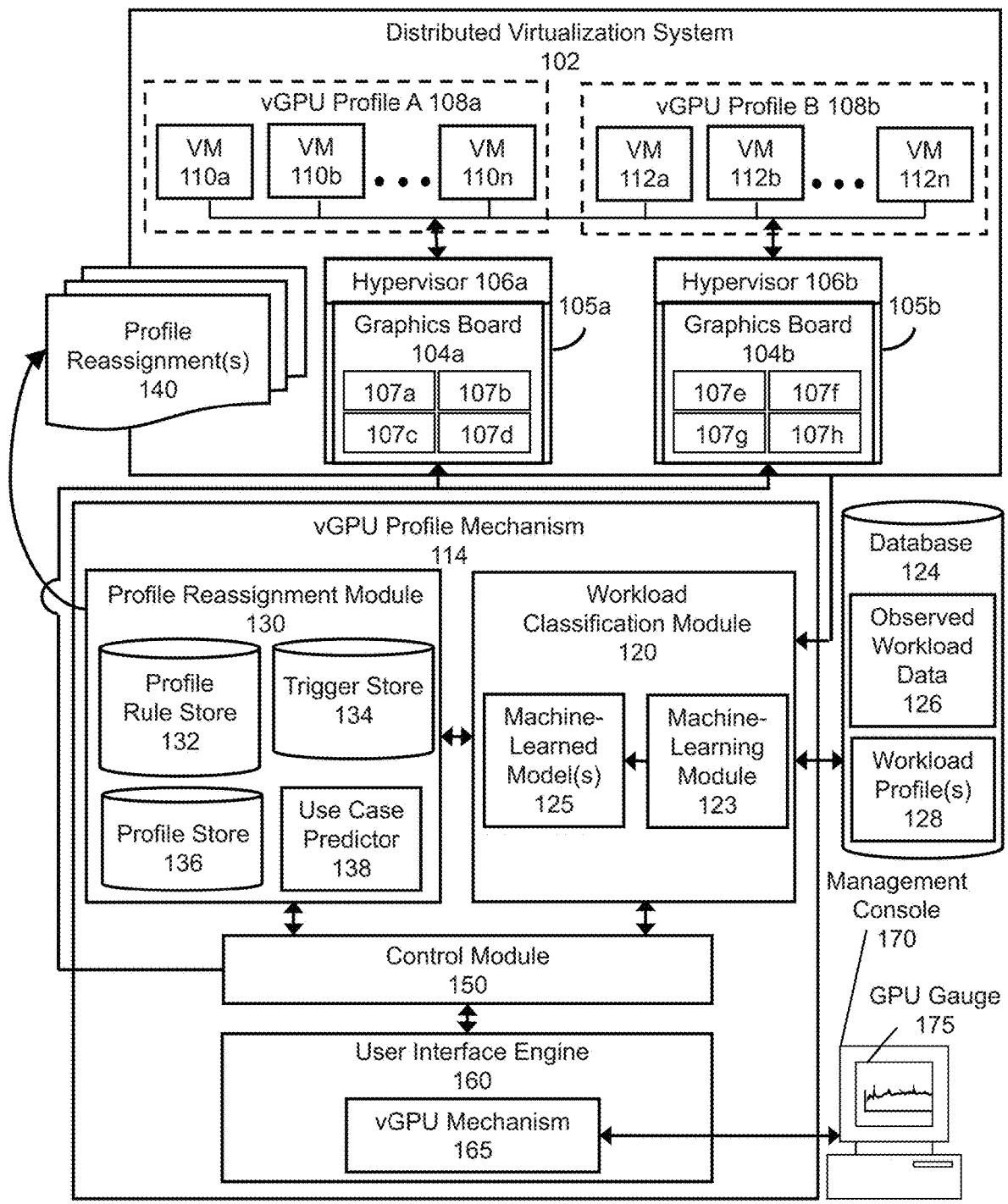
FIG. 1A illustrates an apparatus including a GPU profile mechanism in which some embodiments of the invention are implemented.

The present disclosure provides an improved approach for optimizing the allocation of GPU resources to virtual machines supported by nodes in a networked virtualization system.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

A networked virtualization system includes a number of nodes (e.g., servers, hyperconverged systems that integrate compute and storage, etc.), in which each node supports a number of virtual machines and each node has several units of local storage (e.g., Solid State Drives ("SSDs") and Hard Disk Drives ("HDDs") as well as cloud storage or networked storage (e.g., a storage area network ("SAN")). The number of virtual machines that a node may support is dependent on its resource capacity as well as the workloads being processed by the virtual machines being supported by the node. For example, a node may support a maximum number of virtual machines based on the node's available resources (e.g., memory, CPU, GPU, and scheduling limitations specific to the node), as well as the amount of the node's available resources that are required by each virtual machine to process its workload.

A "virtual machine" or a "VM" refers to a specific software-based implementation of a machine in a virtualization environment, in which the hardware resources of a real computer (e.g., CPU, GPU, memory, etc.) are virtualized or transformed into the underlying support for the fully functional virtual machine that can run its own operating system and applications on the underlying physical resources, just like a real computer. Virtualization works by inserting a thin layer of software directly on the computer hardware or on a host operating system. This layer of software contains a virtual machine monitor or "hypervisor" that allocates hardware resources dynamically and transparently. Multiple operating systems may run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows multiple virtual machines to run on a single physical machine, with each virtual machine sharing the resources of that one physical computer across multiple environments. Different virtual machines can run different operating systems and multiple applications on the same physical computer. One reason for the broad adoption of virtualization in modern business and computing environments is the resource utilization advantages provided by virtual machines. Without virtualization, if a physical machine is limited to a single dedicated operating system, during periods of inactivity by the dedicated operating system, the physical machine is not utilized to perform useful work. This is wasteful and inefficient if there are users on other physical machines, which are currently waiting for computing resources. To address this problem, virtualization allows multiple virtual machines to share the underlying physical resources so that during periods of inactivity by one virtual machine, other virtual machines can take advantage of the resource availability to process workloads. This can produce great efficiencies for the utilization of physical devices, and can result in reduced redundancies and better resource cost management.

FIG. 1A illustrates an apparatus including a vGPU profile mechanism in which some embodiments of the invention are implemented. In various embodiments, some aspects of the embodiments may be implemented separately or as a whole.

A distributed virtualization system 102 (herein after referred to as a "system") includes one or more nodes 105 that each support a number of virtual machines, or "VMs" 110, 112. Each node 105 of the system 102 includes one or more graphics boards 104 that each contain one or more physical GPUs 107. Each node 105 also includes a hypervisor 106 that allocates GPU and other resources of the physical GPUs 107 to the virtual machines 110, 112 supported by the node 105. For illustrative purposes, FIG. 1A shows two nodes 105 included in the system 102, in which each node 105 includes a single graphics board 104 and each graphics board 104 includes four physical GPUs 107. However, in various embodiments, the system 102 may include more or fewer nodes 105, in which each node may include more or fewer graphics boards 104, and in which each graphics board 104 may include more or fewer physical GPUs 107 than depicted in FIG. 1A.

A vGPU profile mechanism 114 retrieves information describing a workload of each virtual machine 110, 112 supported by one or more nodes 105 included in the system 102. A workload may describe an amount of one or more computing resources used by a virtual machine 110, 112 and a duration of use of the one or more computing resources by the virtual machine 110, 112 to perform one or more tasks comprising the workload. For example, a given workload may describe an amount of memory, CPU, or storage required by a virtual machine 110, 112 to run an email application while another workload may describe a different amount of memory, CPU, or storage required by the virtual machine 110, 112 to run a game application. In some embodiments, the vGPU profile mechanism 114 may store the information describing the workload of each of the virtual machines 110, 112 (e.g., as observed workload data 126 in a database 124) for subsequent retrieval.

In addition to the information describing a workload of each virtual machine 110, 112, the vGPU profile mechanism 114 may retrieve additional information describing profiles of various predefined workloads ("workload profiles" 128). A workload profile 128 may describe one or more functions or attributes that generally characterize a given type of workload. For example, a workload profile 128 for a virtual machine 110, 112 running a database management system may be characterized by a high read/write ratio and usage of a high amount of CPU and RAM. Workload profiles 128 may be described in terms of ranges (e.g., between 200 to 300 MB of memory), thresholds (e.g., less than 10% CPU), ratios or percentages (e.g., 75% of available GPU used), patterns (e.g., I/O patterns), etc.

Additionally, the vGPU profile mechanism 114 may retrieve additional information describing assignments of the virtual machines 110, 112 to one or more virtual GPU profiles ("vGPU profiles") 108. Each physical GPU 107 may be associated with a particular vGPU profile 108, which indicates how the virtualized resources of the physical GPU 107 may be allocated to virtual machines 110, 112 supported by a node 105 including the physical GPU 107. For example, vGPU profile A 108a may be associated with physical GPU 107a, physical GPU 107b, physical GPU 107c, or physical GPU 107d on graphics board 104a and describe how resources of the physical GPU 107a-d associated with vGPU profile A 108a may be allocated to virtual machines 110a-n supported by node 105a, on which graphics board 104a is located. In this example, vGPU profile A 108a may describe a frame buffer, a maximum number of users per graphics board 104, a maximum number of displays per user, a maximum resolution per display, etc. Continuing with this example, vGPU profile B 108b may be associated with physical GPU 107e, physical GPU 107f, physical GPU 107g, or physical GPU 107h on graphics board 104b and describe how resources of the physical GPU 107e-h associated with vGPU profile B 108b may be allocated to virtual machines 112a-n supported by node 105b, on which graphics board 104b is located. Furthermore, vGPU profile B 108b may describe a frame buffer, a maximum number of users per graphics board 104, a maximum number of displays per user, a maximum resolution per display, etc. different from that of vGPU profile A 108a.

The vGPU profile mechanism 114 may access stored information describing various vGPU profiles 108 (e.g., from the profile store 136). vGPU profiles 108 included in the profile store 136 may describe each of multiple possible vGPU profiles 108 that may be associated with each physical GPU 107 on each graphics board 104 on each node 105 of the system 102. Different graphics boards 104 may correspond to different possible vGPU profiles 108. For example, vGPU profiles 108 associated with graphics board 104a may only support up to a maximum of 32 users while vGPU profiles 108 associated with graphics board 104b may support up to a maximum of 64 users. vGPU profiles 108 are further described below in conjunction with FIG. 2. Information describing the vGPU profiles 108 stored in the profile store 136 may be received from a system administrator (e.g., via management console 170). Alternatively, the information describing the vGPU profiles 108 may be retrieved from the graphics boards 104 by the vGPU profile mechanism 114 (e.g., via one or more API calls to the graphics boards 104).

The vGPU profile mechanism 114 may also access stored information describing various profile reassignment rules (e.g., from the profile rule store 132). A profile reassignment rule may describe circumstances under which a virtual machine 110, 112 may be reassigned from one vGPU profile 108 to a different vGPU profile 108. For example, a profile reassignment rule may specify that a virtual machine 110, 112 that is assigned to a particular vGPU profile 108 should be reassigned to a different vGPU profile 108 if a difference between an amount of GPU resources utilized by the virtual machine 110, 112 and an amount of GPU resources allocated to the virtual machine 110, 112 is at least a threshold amount. In this example, an additional profile reassignment rule may specify that the virtual machine 110, 112 should be reassigned to a particular vGPU profile 108 based on a type of workload being processed by the virtual machine 110, 112. In some embodiments, a profile reassignment rule may specify a vGPU profile 108 to which a virtual machine 110, 112 should be reassigned based on a use case corresponding to one or more types of workloads being processed by the virtual machine 110, 112. For example, a profile reassignment rule may specify that a particular vGPU profile 108 should be assigned to virtual machines 110, 112 having one or more types of workloads that are associated with a use case corresponding to a high end designer (e.g., a graphic designer, a video editor, etc.).

Based on information describing a type of workload being processed by each virtual machine 110, 112, the workload profile(s) 128, a vGPU profile 108 assigned to each virtual machine 110, 112, the possible vGPU profiles 108 associated with each physical GPU 107, and the profile reassignment rules, the vGPU profile mechanism 114 determines one or more vGPU profile reassignment(s) 140 for one or more of the virtual machines 110, 112. Each vGPU profile reassignment 140 describes a reassignment of a virtual machine 110, 112 from one vGPU profile 108 to a different vGPU profile 108 that will likely result in a more efficient allocation of GPU resources. In other words, GPU resources that are allocated to a virtual machine 110, 112 based on the vGPU profile 108 to which it is reassigned will support the anticipated GPU resource requirements of the virtual machine 110, 112 while minimizing the likelihood that the GPU resources will be wasted. Information describing the reassignment(s) 140 may be presented to a system administrator or other user (e.g., via management console 170).

Upon determining a vGPU profile reassignment 140, the vGPU profile mechanism 114 may reassign a virtual machine 110, 112 to a different vGPU profile 108 based on the vGPU profile reassignment 140. In some embodiments, the vGPU profile mechanism 114 may perform the reassignment automatically. Alternatively, the vGPU profile mechanism 114 may reassign a virtual machine 110, 112 to the different vGPU profile 108 only upon receiving an approval of the reassignment by a system administrator (e.g., via management console 170).

Figure 1B:
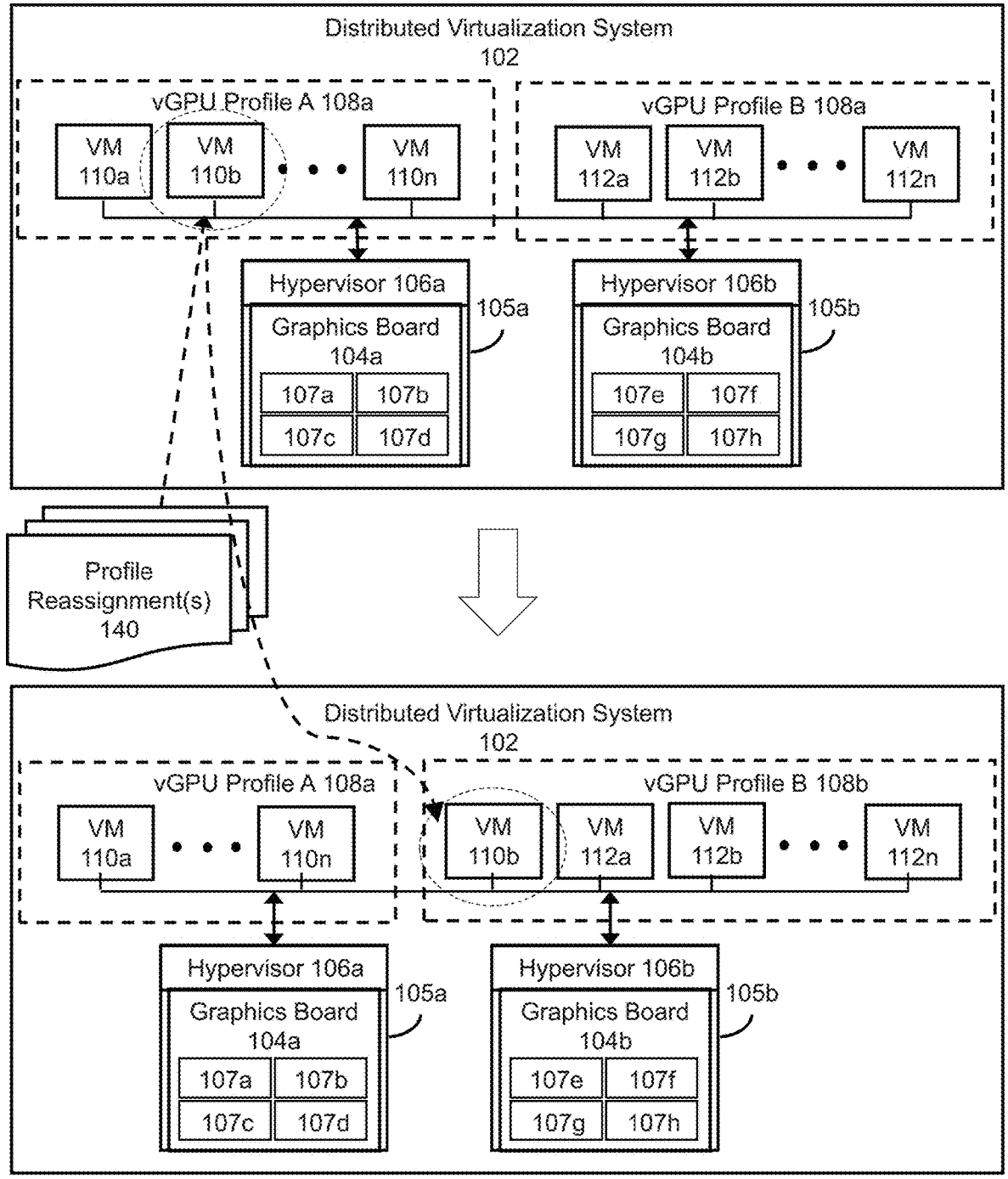
FIG. 1B illustrates reassignment of a virtual machine from a first vGPU profile to a second vGPU profile according to some embodiments of the invention.

In various embodiments, the vGPU profile mechanism 114 may reassign a virtual machine 110, 112 from one vGPU profile 108 associated with a graphics board 104 to a different vGPU profile 108 associated with the same graphics board 104. For example, the vGPU profile mechanism 114 may reassign a virtual machine 110, 112 from a vGPU profile 108 associated with physical GPU 107a to a vGPU profile 108 associated with physical GPU 107c, both of which are located on graphics board 104a. In embodiments in which a node 105 of the system 102 includes multiple graphics boards 104, the vGPU profile mechanism 114 may reassign a virtual machine 110, 112 from a vGPU profile 108 associated with a physical GPU 107 on one graphics board 104 to a vGPU profile 108 associated with a physical GPU 107 on a different graphics board 104. In additional embodiments, the vGPU profile mechanism 114 may reassign a virtual machine 110, 112 from a vGPU profile 108 associated with a graphics board 104 on one node 105 to a vGPU profile 108 associated with a graphics board 104 on a different node 105. For example, as shown in the example of FIG. 1B, based on the profile reassignment(s) 140, virtual machine 110b is reassigned from vGPU profile A 108a, which is associated with graphics board 104a on node 105a to vGPU profile B 108b, which is associated with graphics board 104b on node 105b.

By reassigning a virtual machine 110, 112 to a particular vGPU profile 108, the GPU resources of the associated physical GPU 107 are correspondingly reallocated to the virtual machine 110, 112. For example, if a virtual machine 110, 112 is reassigned to vGPU profile B 108b, the virtual machine 110, 112 is reallocated a particular frame buffer and a particular resolution per display that corresponds to vGPU profile B 108b (e.g., via hypervisor 106b). When a virtual machine 110, 112 is reassigned from one vGPU profile 108 to a different vGPU profile 108, the GPU resources allocated to the virtual machine 110, 112 based on the previous vGPU profile 108 may be deallocated from the virtual machine 110, 112 and the GPU resources corresponding to the new vGPU profile 108 may then be allocated to the virtual machine 110, 112. Alternatively, when a virtual machine 110, 112 is reassigned from an initial vGPU profile 108 to a different vGPU profile 108, GPU resources corresponding to the vGPU profile 108 to which the virtual machine 110, 112 was reassigned may be allocated to the virtual machine 110, 112 prior to deallocation of the GPU resources corresponding to the vGPU profile 108 to which the virtual machine was initially assigned.

In some embodiments, once a virtual machine 110, 112 is reassigned from an initial vGPU profile 108 to a different vGPU profile 108, the workload of the virtual machine 110, 112 may be migrated. For example, the workload of a virtual machine 110, 112 may be migrated from a physical GPU 107 associated with the vGPU profile 108 initially assigned to the virtual machine 110, 112 to a different physical GPU 107 associated with the vGPU profile 108 to which the virtual machine 110, 112 was reassigned. The workload of a virtual machine 110, 112 may be migrated from a first physical GPU 107 to a second physical GPU 107, in which the first physical GPU 107 and the second physical GPU 107 are on the same graphics board 104, on different graphics boards 104 on the same node 105, or on different graphics boards on different nodes 105.

Referring again to FIG. 1A, one or more workload profile(s) 128 stored in the database 124 may be determined by the workload classification module 120. For example, the workload classification module 120 may evaluate workloads of virtual machines 110, 112 of the system 102 that have been verified by a system administrator to be workloads of particular types over a period of time. In this example, the results of the evaluation subsequently may be recorded in one or more automatically or manually generated user editable documents or files that are stored and later retrieved by the workload classification module 120 (e.g., as workload profiles 128). Alternatively, the information describing the workload profile(s) 128 may be received from a user (e.g., a system administrator via management console 170) and stored in the database 124 for subsequent retrieval.

In some embodiments, the workload classification module 120 may include a machine-learning module 123 that trains one or more machine-learned model(s) 125 to classify the types of workloads processed by the virtual machines 110, 112. For example, the machine-learning module 123 may train a model 125 to classify workloads using a classification algorithm based on a set of training data that may be retrieved from database 124 (e.g., observed workload data 126 and workload profile(s) 128). The machine-learned model 125 may then be used to classify new instances of workloads processed by the virtual machines 110, 112. In such embodiments, the machine-learned model 125 may be retrained periodically (e.g., once every week) or upon the occurrence of an event (e.g., upon receipt of a new set of training workloads).

The profile reassignment module 130 of the vGPU profile mechanism 114 includes the profile rule store 132 and the profile store 136 discussed above. The profile reassignment module 130 may determine one or more profile reassignment(s) 140 of one or more virtual machines 110, 112 included in the system 102 based in part on the types of workloads processed by the virtual machines 110, 112 classified by the workload classification module 120. The profile reassignment module 130 may use one or more profile reassignment rules (e.g., retrieved from the profile rule store 132), information describing a current vGPU profile 108 assigned to a virtual machine 110, 112, and information describing one or more additional vGPU profiles 108 (e.g., retrieved from the profile store 136) to determine a profile reassignment 140 of the virtual machine 110, 112. The profile reassignment module 130 may then reassign the virtual machine 110, 112 to a different vGPU profile 108 according to the profile reassignment 140 (e.g., automatically or upon receiving approval from a system administrator).

In addition to the profile rule store 132 and the profile store 136, the profile reassignment module 130 may also include a trigger store 134. The trigger store 134 may store information describing one or more triggers or alerts that are activated upon the occurrence of an event detected by the vGPU profile mechanism 114. For example, a trigger may be activated if the GPU resources being used by a virtual machine 110, 112 account for at least 75% of the GPU resources allocated to the virtual machine 110, 112. Activation of a trigger may result in the generation of a user interface that includes an alert indicating the reason that the trigger was activated. The user interface may then be presented to a system administrator (e.g., via management console 170).

In some embodiments, the profile reassignment module 130 may include a use case predictor 138. The use case predictor 138 may predict a use case associated with a virtual machine 110, 112 based on one or more types of workloads processed by the virtual machine 110, 112, and classified by the workload classification module 120. The use cases predicted by the use case predictor 138 may describe broad categories of virtual machine users that differ based on their anticipated GPU resource requirements. For example, virtual machine users who require the greatest GPU resources may correspond to a "high end designer" use case, virtual machine users who require a moderate amount of GPU resources may correspond to a "designer" use case, and virtual machine users who require the fewest GPU resources may correspond to a "power user" use case. Alternatively, the use cases predicted by the use case predictor 138 may describe more specific categories of virtual machine users (e.g., "garners," "graphic designers," etc.).

In some embodiments, the profile assignment module 130 may determine a profile reassignment 140 of a virtual machine 110, 112 based at least in part on a use case associated with the virtual machine 110, 112 predicted by the use case predictor. For example, if a virtual machine 110, 112 is assigned to a vGPU profile 108 associated with a "designer" use case and the use case predictor 138 predicts that the virtual machine 110, 112 is associated with a "high end designer" use case, the profile reassignment module 130 may determine that the virtual machine 110, 112 should be reassigned to a different vGPU profile 108 associated with the "high end designer" use case. In this example, the profile assignment module 130 may then reassign the virtual machine 110, 112 to the vGPU profile 108 associated with the "high end designer" use case.

The vGPU profile mechanism 114 may also include a control module 150 to interface with the workload classification module 120 and the profile reassignment module 130. For example, the control module 150 may be used to coordinate the receipt or retrieval of inputs, the output of profile reassignment(s) 140, and the implementation of rules or commands and processing of data received via the user interface engine 160 or from the database 124. The control module 150 may also be used to communicate one or more API calls to the graphics boards 104 in order to retrieve information required by the vGPU profile mechanism 114 to assign or reassign one or more vGPU profiles 108 to one or more virtual machines 110, 112 of the system 102. For example, responsive to sending an API call to graphics board 104*b*, the vGPU profile mechanism 114 receives information describing a vGPU profile 108*b* associated with the graphics board 104*b* and information describing the workloads being processed by the virtual machines 112*a-n* to which the vGPU profile 108*b* is assigned.

Additionally, the vGPU profile mechanism 114 may include a user interface engine 160. The user interface engine 160 allows a system administrator or other user to interact with the vGPU profile mechanism 114 either remotely or via a local instance of the vGPU profile mechanism 114, such as through a traditional application interface or via the management console 170 for remote management of the vGPU profile mechanism 114. For example, a system administrator may interact with the vGPU profile mechanism 114 to approve of a profile reassignment 140 determined by the profile reassignment module 130.

The user interface engine 160 may include a vGPU mechanism 165 that generates one or more gauges ("vGPU gauges" 175), tables, or other visual representations of usage and/or allocation of GPU resources to one or more virtual machines 110, 112 of the system 102. For example, the vGPU mechanism 165 may generate a table that illustrates information describing GPU resources from multiple graphics boards 104 on a node 105 (e.g., information identifying each virtual machine 110, 112 assigned to a vGPU profile 108 associated with each graphics board 104, the percentage of GPU resources being utilized, etc.). As an additional example, the vGPU mechanism 165 may generate a vGPU gauge 175 comprising a line graph that illustrates GPU resource usage and/or allocation as a function of time for a particular graphics board 104, for a particular physical GPU 107, or for a particular virtual machine 110, 112. In some embodiments, the vGPU gauges 175 may include interactive elements capable of receiving inputs from a system administrator or other user via the management console 170. For example, a user may interact with a scroll bar to view vGPU gauges 175 for additional virtual machines 110, 112 not currently presented or to change a time frame for which GPU resource usage for the virtual machines 110, 112 are being presented.

In addition to vGPU gauges 175, the vGPU mechanism 165 may generate additional types of user interface elements that may be presented in a display area of the management console 170. In some embodiments, the vGPU mechanism 165 may generate a list of alerts activated upon the detection of an event by the vGPU profile mechanism 114 (e.g., based on a trigger or alert stored in the trigger store 134). For example, an alert may be activated when usage of GPU resources by a virtual machine 110, 112 has reached a threshold percentage of the GPU resources allocated to the virtual machine 110, 112. Each alert may include details related to the alert, such as information describing the nature of the alert, information identifying the virtual machine 110, 112 affected, the time at which the alert was activated, etc. Furthermore, the list of alerts may include one or more interactive elements that allow a user to provide an input responsive to an alert (e.g., buttons or drop-down menus allowing a system administrator to reassign a virtual machine 110, 112 to a different vGPU profile 108). In various embodiments, the vGPU mechanism 165 may also generate a list of events detected by the vGPU profile mechanism 114 (e.g., retraining of a machine-learned model 125, installation of a new graphics board 104, reassignment of a virtual machine 110, 112 to a different vGPU profile 108, etc.). Similar to the list of alerts, each event may include details related to the event, such as a general description of the type of event, a time that the event occurred, and a detailed description of the event (e.g., the graphics boards 104 or virtual machines 110, 112 involved in the event).

The database 124 may comprise any combination of physical and logical structures as is ordinarily used for database systems, such as Hard Disk Drives (HDDs), Solid State Drives (SSDs), logical partitions, and the like. The database 124 is illustrated as a single database containing observed workload data 126 and workload profile(s) 128 that is associated with the vGPU profile mechanism 114. However, the database 124 may be associated with a cluster that is separate and distinct from the vGPU profile mechanism 114. Further, the database 124 may be accessible via a remote server or the database 124 may include multiple separate databases that contain some portion of the observed workload data 126 and/or workload profile(s) 128.

In various embodiments, the vGPU profile mechanism 114 may be associated with or operate on more than one cluster, such that the system 102 corresponds to one or more clusters of nodes. In embodiments in which several clusters are included in the system 102, the vGPU profile mechanism 114 may analyze each cluster separately. Furthermore, in such embodiments, multiple clusters may interface with one or more databases, such as database 124, that contain locations for storing or retrieving relevant observed workload data 126 or workload profile(s) 128. In one embodiment, the vGPU profile mechanism 114 is a management application or is part of a management application that may be used to manage one or more clusters and allows the vGPU profile mechanism 114 to interface with the one or more clusters or provides a means for operating the vGPU profile mechanism 114. For instance, the management application may allow the vGPU profile mechanism 114 to access one or more databases on one or more clusters for retrieval and storage of observed workload data 126.

Some embodiments may be implemented on one or more management consoles 170, user stations, or other devices that include any type of computing station that may be used to operate or interface with the vGPU profile mechanism 114. Examples of such management consoles 170, user stations, and other devices include, for example, workstations, personal computers, servers, or remote computing terminals. Management consoles 170 may also include one or more input devices for a user to provide operational control over the activities of the system 102, such as a mouse or keyboard to manipulate a pointing object in a graphical user interface. The vGPU profile mechanism 114 may operate on a management console 170 for a plurality of systems or may operate on one or more management consoles 170 distributed across the systems. Further details regarding methods and mechanisms for implementing the virtualization system illustrated in FIGS. 1A and 1B are described in U.S. Pat. No. 8,601,473, titled "ARCHITECTURE FOR MANAGING I/O AND STORAGE FOR A VIRTUALIZATION ENVIRONMENT", issued on Dec. 3, 2013, which is hereby incorporated by reference in its entirety.

FIG. 2 illustrates example tables for various vGPU profiles 108 for different graphics boards 104 according to some embodiments of the invention. Each table of FIG. 2 corresponds to a different type of graphics board 104. For example, table 200 corresponds to a graphics board 104 of type A while table 202 corresponds to a table for a graphics board 104 of type B, as identified by column 205 of both tables 200, 202. Each type of graphics board 104 may be associated with multiple possible vGPU profiles 108. For example, graphics board A is associated with vGPU profiles A-1, through A-8 while graphics board B is associated with vGPU profiles B1 through B-8 as indicated in column 210. As described above in conjunction with FIG. 1A, each vGPU profile 108 indicates how the virtualized resources of a physical GPU 107 on a graphics board 104 may be allocated to virtual machines 110, 112 supported by a node 105 including the graphics board 104. For example, as shown in table 200, vGPU profile A-1 indicates that a maximum number of users that may be supported by graphics board A is two (column 230), in which a frame buffer corresponds to 8192 MB (column 215), each user may have a maximum of four displays (column 220), and the maximum resolution per display is 3840×2160 (column 225). Furthermore, the use case corresponding to profile A-1 is that of a high end designer (column 235).

A general trend that is illustrated in both tables 200, 202 that is central to the concept of vGPU profiles 108 and the virtualization of GPU resources on a physical GPU 107 is the tradeoff between the amount of GPU resources that may be allocated per user and the maximum number of users (i.e., the number of virtual machines 110, 112) that may be supported by each graphics board 104. For example, since the use case for vGPU profile A-1 corresponds to that of a high end designer (e.g., a user who is performing video editing tasks), one would expect that the amount of GPU resources that may be allocated to a virtual machine 110, 112 assigned to this vGPU profile 108 should be relatively greater than the amount of GPU resources that may be allocated to a virtual machine 110, 112 assigned to vGPU profile A-2, since the use case for this profile corresponds to that of a designer (e.g., a user who is browsing the Internet). As shown in column 215, the buffer frame corresponding to vGPU profile A-1 (8192 MB) is double that corresponding to vGPU profile A-2 (4096 MB). However, as shown in column 230, the maximum number of users per graphics board 104 for graphics board A-1 (2) is half that of A-2 (4), in which the maximum displays per user and the maximum resolution per display are the same for both profiles (columns 220 and 225). Therefore, the tradeoff between supporting more users/virtual machines 110, 112 on a graphics board 104 is the allocation of fewer resources to each user/virtual machine 110, 112.

Figure 3A:
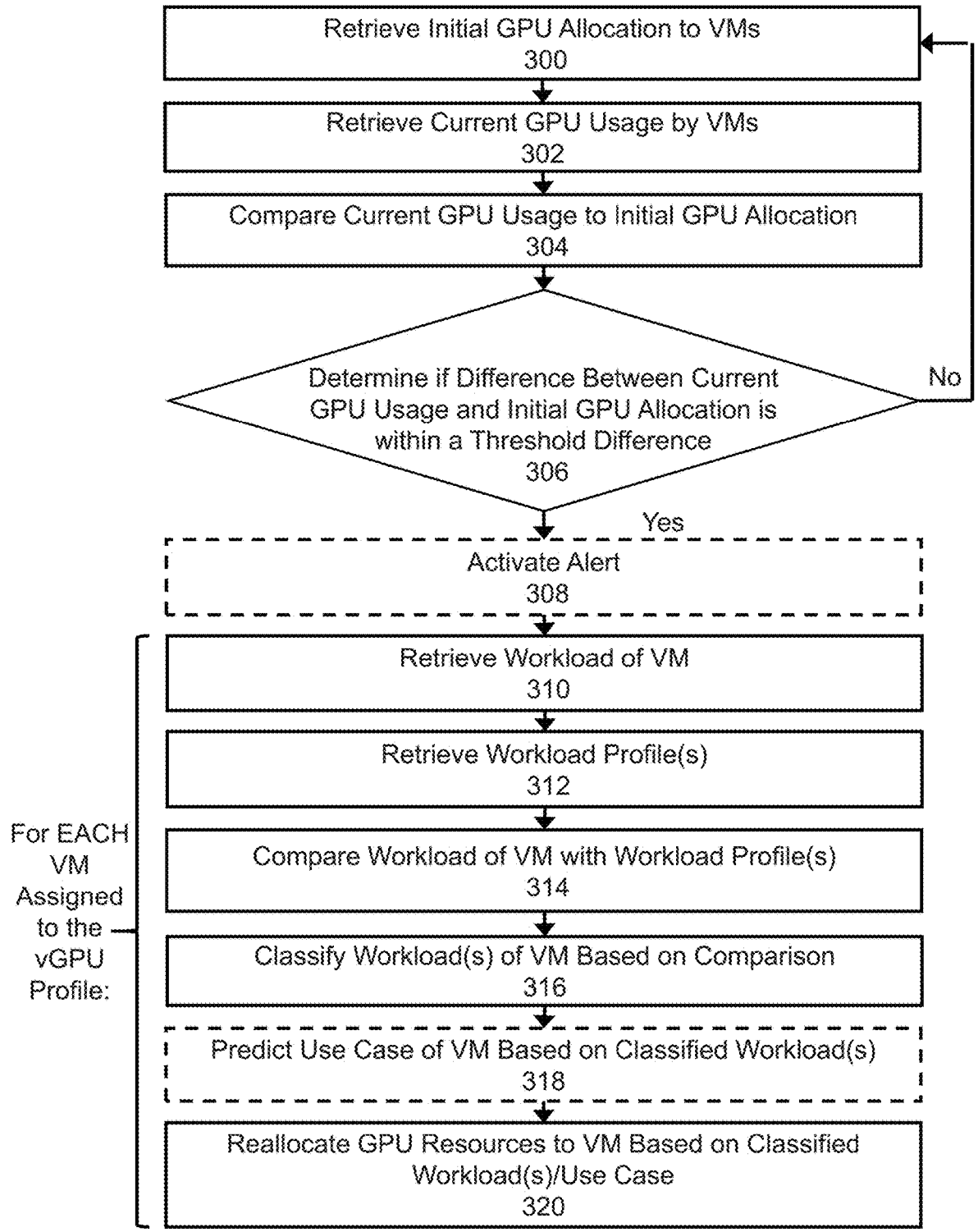
FIG. 3A is a flowchart illustrating reallocation of GPU resources according to some embodiments of the invention.
Figure 3B:
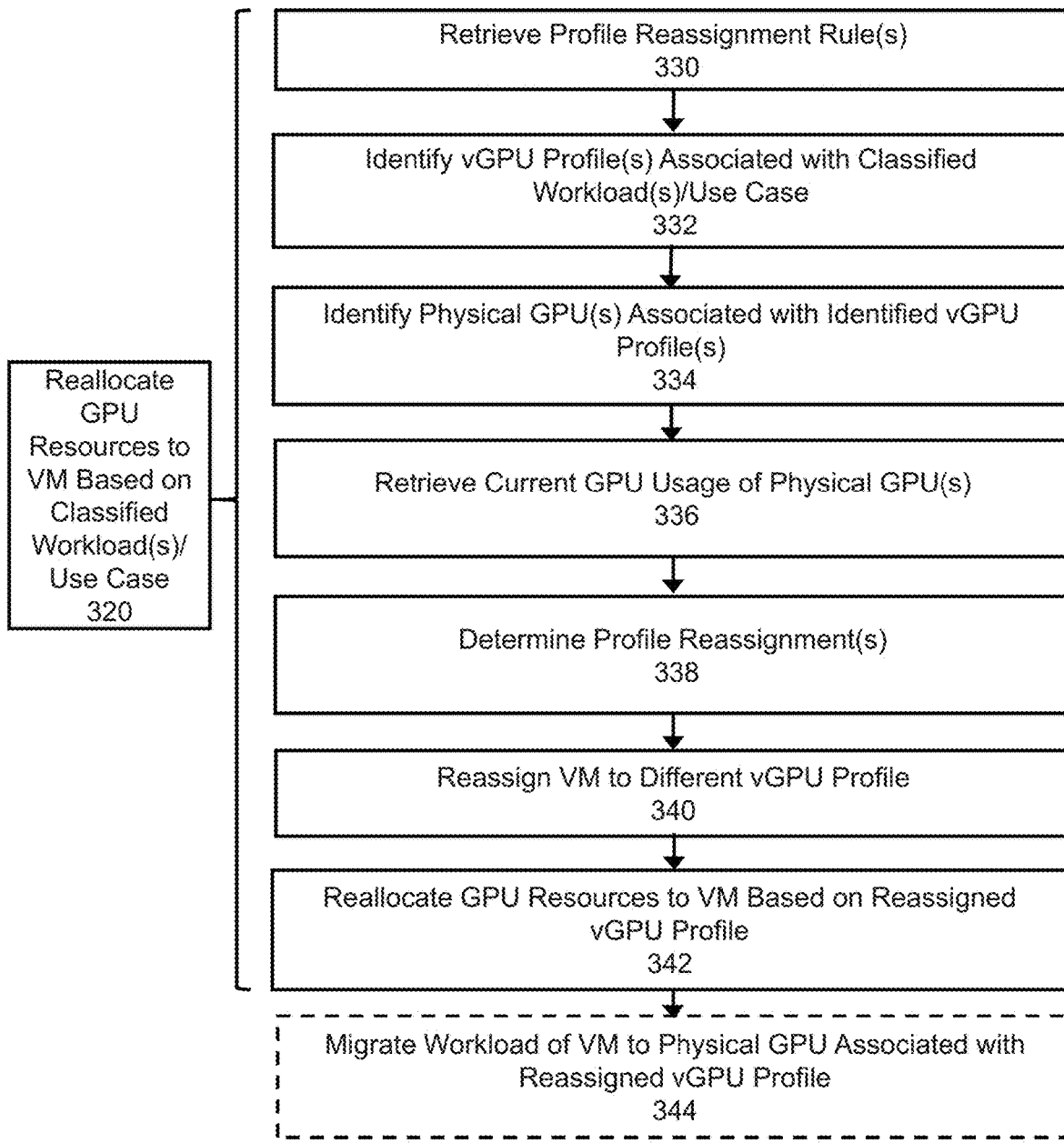
FIG. 3B is an additional flowchart illustrating reallocation of GPU resources according to some embodiments of the invention.

FIGS. 3A and 3B are flowcharts illustrating reallocation of GPU resources according to some embodiments of the invention. Some of the steps illustrated in these flowcharts are optional in different embodiments. In some embodiments, the steps may be performed in an order different from that described in FIGS. 3A and 3B.

Referring first to FIG. 3A, the flow chart begins when the vGPU profile mechanism 114 retrieves 300 information describing an initial allocation of GPU resources to one or more virtual machines 110, 112 of the system 102. The initial allocation of GPU resources corresponds to a vGPU profile 108 associated with one or more graphics boards 104 installed on one or more nodes 105 of the system 102. The initial allocation of GPU resources allocated to the virtual machine(s) 110, 112 may be retrieved 300 by the vGPU profile mechanism 114 via an API call to one or more graphics boards 104 located on nodes 105 supporting the virtual machines 110, 112. For example, the control module 150 of the vGPU profile mechanism 114 may send an API call to a graphics board 104 on a node 105 of the system 102 that requests information describing a physical GPU 107 on the graphics board 104, the vGPU profile 108 associated with the physical GPU 107 and information identifying each virtual machine 110, 112 initially assigned to the vGPU profile 108. The vGPU profile mechanism 114 then receives the information describing the virtual machines 110, 112 initially assigned to the vGPU profile 108, which corresponds to the initial allocation of GPU resources to the virtual machines 110, 112.

In a similar manner, the vGPU profile mechanism 114 may retrieve 302 information describing a current usage of GPU resources by the one or more virtual machines 110, 112. For example, the control module 150 of the vGPU profile mechanism 114 may send an additional API call to the same graphics board 104 in the above example that requests information describing the GPU resources (e.g., GPU memory) currently being used by the virtual machines 110, 112. The vGPU profile mechanism 114 then receives the information describing the GPU resources currently being used by the virtual machine(s) 110, 112. In some embodiments, the vGPU profile mechanism 114 may retrieve 302 the information describing the current usage of GPU resources by the one or more virtual machines 110, 112 in the same API call sent to retrieve 300 the information describing the initial allocation of GPU resources to the virtual machine(s) 110, 112.

The profile reassignment module 130 of the vGPU profile mechanism 114 may compare 304 the current GPU resource usage by the one or more virtual machines 110, 112 to the initial GPU resource allocation to the one or more virtual machines 110, 112. In some embodiments, the profile reassignment module 130 may perform the comparison by determining a difference between the current GPU resource usage and the initial GPU resource allocation. For example, the profile reassignment module 130 may determine a difference between an amount of RAM allocated to each virtual machine 110, 112 from a physical GPU 107 and the amount of RAM actually used by each virtual machine 110, 112 and determine a sum of the differences to be the difference between the current GPU resource usage and the initial GPU resource allocation.

In various embodiments, the profile reassignment module 130 may determine 306 if the difference between the current GPU resource usage by the one or more virtual machines 110, 112 and the initial GPU resource allocation to the one or more virtual machines 110, 112 is within a threshold difference. For example, if the threshold difference is 1024 MB of GPU RAM and the difference between the current GPU resource usage and the initial GPU resource allocation is 1026 MB of GPU RAM, the profile reassignment module 130 determines 306 that the difference is not within the threshold difference. If the profile reassignment module 130 determines 306 that the difference is not within the threshold difference, the process may begin anew at step 300. Alternatively, in the above example, if the threshold difference is 2048 MB of GPU RAM and the difference between the current GPU resource usage and the initial GPU resource allocation is 1026 MB of GPU RAM, the profile reassignment module 130 determines 306 that the difference is within the threshold difference. The threshold difference may be determined by the profile reassignment module 130 based on one or more profile reassignment rules retrieved from the profile rule store 132. For example, a profile reassignment rule retrieved from the profile rule store 132 may associate a vGPU profile 108 associated with a physical GPU 107 with a particular threshold difference. Alternatively, the threshold difference may be received from a user (e.g., set manually by a system administrator via management console 170).

In some embodiments, if the profile reassignment module 130 determines 306 that the difference is within the threshold difference, (i.e., the current GPU resource usage is within a threshold of the initial GPU resource allocation), the vGPU profile mechanism 114 may activate 308 an alert. For example, suppose a trigger (e.g., retrieved from the trigger store 134) is activated upon the occurrence of detection by the vGPU profile mechanism 114 that the difference between the current GPU resource usage and the initial GPU resource allocation is within the threshold difference. In this example, activation of the trigger may result in the generation of a user interface by the vGPU mechanism 165 of the user interface engine 160 that includes an alert and a reason that the alert was activated. The user interface may then be presented to a system administrator (e.g., in a pop-up window via management console 170).

If the profile reassignment module 130 determines 306 that the difference is within the threshold difference, the vGPU profile mechanism 114 performs a process for each of the one or more virtual machines 110, 112 assigned to the vGPU profile 108. In this process, the vGPU profile mechanism 114 evaluates each virtual machine 110, 112 to determine whether reassignment of a virtual machine 110, 112 to a different vGPU 108 profile is likely to result in a more efficient utilization of GPU resources.

In the first step of the process, the workload classification module 120 of the vGPU profile mechanism 114 retrieves 310 information describing a workload of a virtual machine 110, 112. A workload may describe an amount of one or more computing resources used by the virtual machine 110, 112 and a duration of use of the one or more computing resources by the virtual machine 110, 112 to perform one or more tasks comprising the workload. For example, a given workload may describe an amount of memory, CPU, GPU, or storage required by a virtual machine 110, 112 to run a database management application while another workload may describe a different amount of memory, CPU, or storage required by the virtual machine 110, 112 to run a video editing application. In some embodiments, the information describing the workload of the virtual machine 110, 112 retrieved 310 by the workload classification module 120 may comprise historical workload information (e.g., observed workload data 126 retrieved 310 from database 124 that was recently stored by the workload classification module 120).

The workload classification module 120 may then retrieve 312 one or more workload profiles 128 from the database 124. A workload profile 128 may describe one or more functions or attributes that generally characterize a given type of workload. For example, a workload profile 128 for a virtual machine 110, 112 running a database management system may be characterized by a high read/write ratio and usage of a high amount of CPU and RAM. Workload profiles 128 may be described in terms of ranges (e.g., between 200 to 300 MB of memory), thresholds (e.g., greater than 50% CPU), ratios or percentages (e.g., 75% of available GPU used), patterns (e.g., read/write patterns), etc.

Once the workload classification module 120 has retrieved 310, 312 the information describing the workload of the virtual machine 110, 112 as well as the workload profile(s) 128, the workload classification module 120 may compare 314 the workload of the virtual machine 110, 112 to the workload profile(s) 128 and classify 316 the workload of the virtual machine 110, 112 based on the comparison. The workload classification module 120 may classify 316 the workload of the virtual machine 110, 112 as a particular type of workload if the workload has at least a threshold measure of similarity to a workload profile 128 of that type. In some embodiments, the workload classification module 120 may include a machine-learning module 123 that trains one or more machine-learned model(s) 125 to classify 316 one or more types of workloads that may be processed by the virtual machine 110, 112. For example, the machine-learning module 123 may train a model to classify 316 workloads using a classification algorithm based on a set of training data that may be retrieved from database 124 (e.g., observed workload data 126 and workload profile(s) 128). The machine-learned model 125 may then be used to classify 316 new instances of workloads processed by the virtual machine 110, 112. In various embodiments, the workload classification module 120 may classify multiple workloads being processed by the virtual machine 110, 112. For example, the virtual machine 110, 112 may be processing multiple workloads if it is running a word processing application as well as a video streaming application simultaneously. Once the workload classification module 120 has classified 316 a workload of the virtual machine 110, 112, the classified workload is communicated to the profile reassignment module 130.

Upon receiving the classified workload(s) of the virtual machine 110, 112 from the workload classification module 120, in some embodiments, the use case predictor 138 of the profile reassignment module 130 may predict 318 a use case associated with the virtual machine 110, 112 based on the classified workload(s). The use case predictor 138 may predict 318 the use case associated with the virtual machine 110, 112 based on one or more types of workloads processed by the virtual machine 110, 112, and classified by the workload classification module 120, as described above. The use case predicted 318 by the use case predictor 138 may describe a broad category of virtual machine users that are categorized based on their anticipated GPU resource requirements. For example, a virtual machine user who requires the greatest GPU resources that may be allocated from a physical GPU 107 may correspond to a "high end designer" use case, while a virtual machine user who requires a moderate amount of GPU resources may correspond to a "designer" use case, and a virtual machine user who requires the fewest GPU resources may correspond to a "power user" use case. Alternatively, the use case predicted 318 by the use case predictor 138 may describe more a specific category of virtual machine users (e.g., "gamer," "graphic designer," etc.).

The profile reassignment module 130 may reallocate 320 GPU resources to the virtual machine 110, 112 based on the information describing the classified workload(s) and/or the use case associated with the virtual machine 110, 112. For example, the profile reassignment module 130 may reassign the virtual machine 110, 112 to a different vGPU profile 108 associated with the classified workload(s) and/or the user case associated with the virtual machine 110, 112 and reallocate 320 GPU resources to the virtual machine 110, 112 that correspond to the vGPU profile 108 to which the virtual machine 110, 112 was reassigned. The GPU resources reallocated 320 to the virtual machine 110, 112 are different from those initially allocated to the virtual machine 110, 112 and correspond to a different vGPU profile 108 to which the virtual machine 110, 112 was initially assigned. The GPU resources reallocated 320 to the virtual machine 110, 112 will support the anticipated GPU resource requirements of the virtual machine 110, 112 while minimizing the likelihood that the GPU resources will be wasted.

In some embodiments, the step of reallocating 320 the GPU resources to the virtual machine 110, 112, may comprise multiple sub-steps, which are illustrated in FIG. 3B. To reallocate 320 GPU resources to the virtual machine 110, 112 the profile reassignment module 130 may retrieve 330 stored information describing one or more profile reassignment rules (e.g., from the profile rule store 132). A profile reassignment rule may identify 332 one or more vGPU profiles 108 associated with the classified workload(s) and/or the use case. For example, a profile reassignment rule may associate one or more vGPU profiles 108 with a particular type of classified workload. As an additional rule, a profile reassignment rule may associate one or more vGPU profiles 108 with a use case corresponding to a high end designer (e.g., a graphic designer, a video editor, etc.).

Based on the one or more vGPU profiles 108 associated with the classified workload(s) and/or the use case identified 332 by the profile reassignment rule(s), the vGPU profile mechanism 114 may identify 334 one or more physical GPUs 107 associated with the one or more vGPU profiles 108. For example, the control module 150 of the vGPU profile mechanism 114 may send an API call to each of one or more graphics boards 104 on each of one or more nodes 105 of the system 102 to request information describing each physical GPU 107 on each graphics board 104 and the vGPU profile 108 associated with each physical GPU 107. The vGPU profile mechanism 114 then receives the information describing the physical GPU(s) 107 associated with the one or more vGPU profiles 108 and the graphics board(s) 104 and node(s) 105 on which the physical GPU(s) 107 are located.

The vGPU profile mechanism 114 may then retrieve 336 information describing a current usage of GPU resources for each of the physical GPU(s) 107 associated with the one or more vGPU profiles 108. For example, the control module 150 of the vGPU profile mechanism 114 may send an additional API call to the same graphics board(s) 104 in the above example that requests information describing the GPU resources currently being used by one or more virtual machines 110, 112. The vGPU profile mechanism 114 then receives the information describing the GPU resources of each of the graphics board(s) 104 currently being used. In some embodiments, the vGPU profile mechanism 114 may retrieve 336 the information describing the current usage of GPU resources in the same API call sent to identify 334 the one or more physical GPUs 107 associated with the one or more vGPU profiles 108.

Based on the current usage of GPU resources for each of the physical GPU(s) 107 associated with the one or more vGPU profiles 108, the profile reassignment module 130 determines 338 a set of vGPU profile reassignment(s) 140 for the virtual machine 110, 112. Each vGPU profile reassignment 140 describes a reassignment of the virtual machine 110, 112 from the initial vGPU profile 108 to a different vGPU profile 108 that will likely result in a more efficient allocation of GPU resources. In some embodiments, the set of GPU profile reassignment(s) 140 determined 338 by the reassignment module 130 comprises a null set. For example, the set of GPU profile reassignment(s) 140 determined 338 by the reassignment module 130 comprises a null set if the initial vGPU assignment of the virtual machine 110, 112 corresponds to the most efficient allocation of GPU resources to the virtual machine 110, 112. As an additional example, the set of GPU profile reassignment(s) 140 determined 338 by the reassignment module 130 comprises a null set if reassignment of the virtual machine 110, 112 to a different vGPU profile 108 is not possible (e.g., insufficient GPU resources are available on a different physical GPU 107). Information describing the profile reassignment(s) 140 may be presented to a system administrator or other user (e.g., via management console 170).

Upon determining 338 one or more vGPU profile reassignments 140, the profile reassignment module 130 may reassign 340 the virtual machine 110, 112 to a different vGPU profile 108 based on the vGPU profile reassignment 140. In some embodiments, the vGPU profile mechanism 114 may perform the reassignment automatically. Alternatively, the vGPU profile mechanism 114 may reassign 340 the virtual machine 110, 112 to the different vGPU profile 108 only upon receiving an approval of the reassignment by a system administrator (e.g., via the management console 170).

In embodiments in which the profile reassignment module 130 determines multiple profile reassignments 140, the profile reassignment module 130 may reassign 340 the virtual machine 110, 112 to a different vGPU profile 108 based on additional types of information. For example, the profile reassignment module 130 may retrieve 330 one or more additional profile reassignment rules to determine how to select the vGPU profile 108 to which the virtual machine 110, 112 should be reassigned (e.g., randomly, based on the number of virtual machines 110, 112 currently assigned to each vGPU profile 108, etc.). As an additional example, if the information describing the profile reassignments 140 are presented to a system administrator, the profile reassignment module 130 may receive an input from a system administrator describing a selection of a vGPU profile 108; the profile reassignment module 130 may then reassign 340 the virtual machine 110, 112 to the vGPU profile 108 specified in the selection.

In various embodiments, the profile reassignment module 130 may reassign 340 the virtual machine 110, 112 from one vGPU profile 108 associated with a graphics board 104 to a different vGPU profile 108 associated with the same graphics board 104. In embodiments in which a node 105 of the system 102 includes multiple graphics boards 104, the profile reassignment module 130 may reassign 340 the virtual machine 110, 112 from a vGPU profile 108 associated with a physical GPU 107 on one graphics board 104 to a vGPU profile 108 associated with a physical GPU 107 on a different graphics board 104. In additional embodiments, the profile reassignment module 130 may reassign 340 the virtual machine 110, 112 from a vGPU profile 108 associated with a graphics board 104 on one node 105 to a vGPU profile 108 associated with a graphics board 104 on a different node 105.

By reassigning 340 the virtual machine 110, 112 to a particular vGPU profile 108, the GPU resources of the associated physical GPU 107 are correspondingly reallocated 342 to the virtual machine 110, 112. For example, if the virtual machine 110, 112 is reassigned 340 to a particular vGPU profile 108, the virtual machine 110, 112 is reallocated 342 GPU resources including a particular frame buffer and a particular resolution per display that correspond to that vGPU profile 108. GPU resources reallocated 342 to the virtual machine 110, 112 may comprise an amount of GPU resources that is greater than or less than the initial allocation of GPU resources. When the virtual machine 110, 112 is reassigned from its initial vGPU profile 108 to the different vGPU profile 108, the GPU resources allocated to the virtual machine 110, 112 based on the initial vGPU profile 108 may be deallocated from the virtual machine 110, 112 and the GPU resources corresponding to the vGPU profile 108 to which the virtual machine 110, 112 was reassigned may then be reallocated 342 to the virtual machine 110, 112. Alternatively, when the virtual machine 110, 112 is reassigned 340 from its initial vGPU profile 108 to the different vGPU profile 108, GPU resources corresponding to the vGPU profile 108 to which the virtual machine 110, 112, is reassigned may be allocated to the virtual machine 110, 112, prior to deallocation of the GPU resources corresponding to the vGPU profile 108 to which the virtual machine 110, 112 was initially assigned.

In some embodiments, once the virtual machine 110, 112 is reassigned from the initial vGPU profile 108 to a different vGPU profile 108, the workload of the virtual machine 110, 112 may be migrated 344. For example, the workload of the virtual machine 110, 112 may be migrated 344 from a physical GPU 107 associated with the vGPU profile 108 initially assigned to the virtual machine 110, 112 to a different physical GPU 107 associated with the vGPU profile 108 to which the virtual machine 110, 112 was reassigned. The workload of a virtual machine 110, 112 may be migrated 344 from a first physical GPU 107 to a second physical GPU 107, in which the first physical GPU 107 and the second physical GPU 107 are on the same graphics board 104, on different graphics boards 104 on the same node 105, or on different graphics boards on different nodes 105.

Figure 3C:
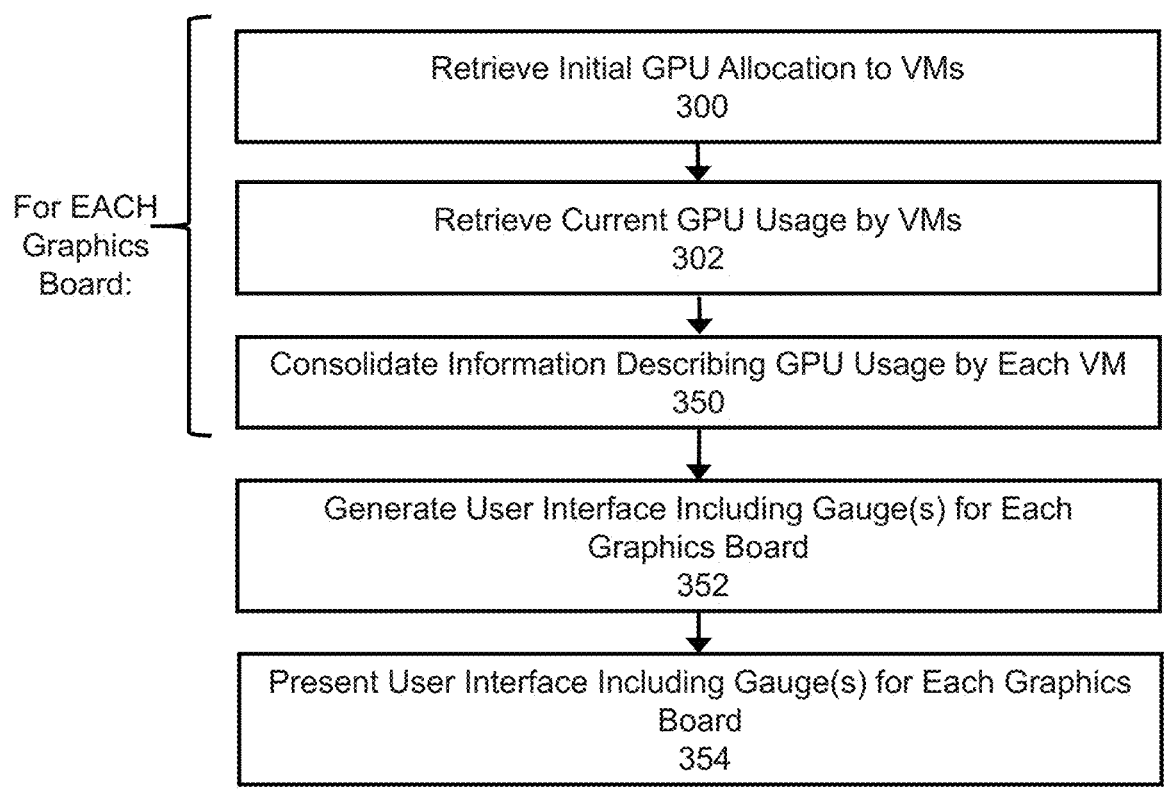
FIG. 3C is a flow chart illustrating a method for presenting a user interface including GPU resource-related gauge(s) for each graphics board on a node in a networked virtualization system according to some embodiments of the invention.
Figure 3D:
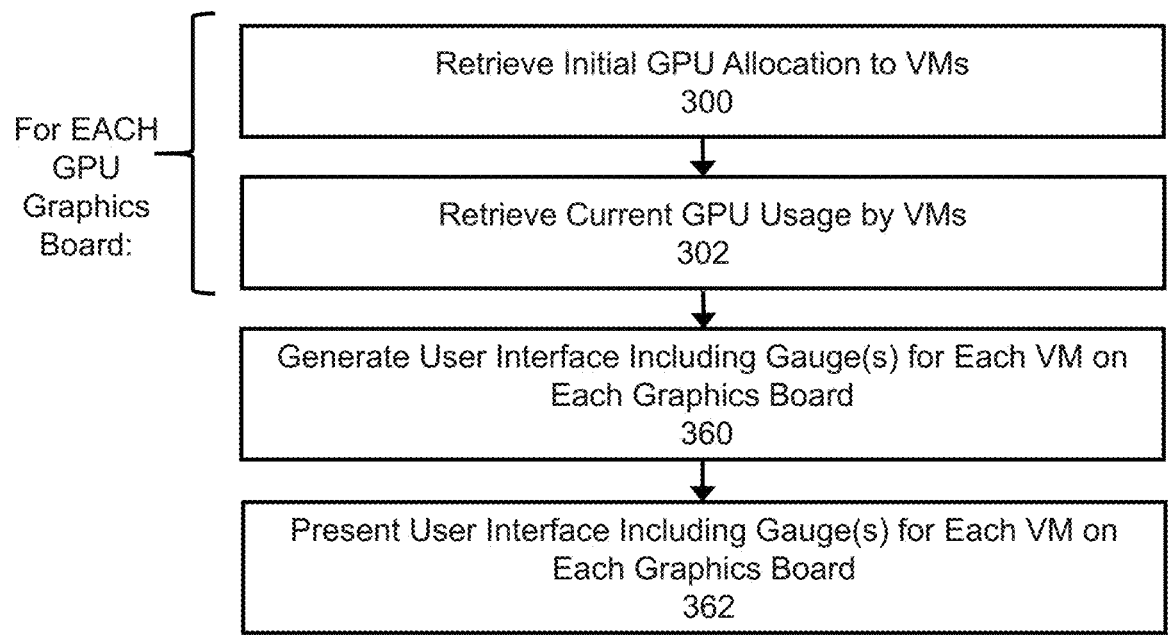
FIG. 3D is a flow chart illustrating a method for presenting a user interface including GPU resource-related gauge(s) for each virtual machine supported by each graphics board on a node in a networked virtualization system according to some embodiments of the invention.

FIG. 3C is a flowchart illustrating a method for presenting a user interface including GPU resource-related gauge(s) for each graphics board on a node in a networked virtualization system according to some embodiments of the invention and FIG. 3D is a flowchart illustrating a method for presenting a user interface including GPU resource-related gauge(s) for each virtual machine supported by each graphics board on a node in a networked virtualization system according to some embodiments of the invention. Some of the steps illustrated in these flowcharts are optional in different embodiments. In some embodiments, the steps may be performed in an order different from that described in FIGS. 3C and 3D.

During various steps described above in conjunction with FIG. 3A, one or more vGPU gauges 175 describing usage and/or allocation of GPU resources to one or more virtual machines 110, 112 of the system 102 may be generated and presented to a system administrator or other user. Referring first to FIG. 3C, after the vGPU profile mechanism 114 has retrieved 300, 302 information describing the initial allocation of GPU resources to one or more virtual machines 110, 112 of the system 102 and information describing the current usage of GPU resources by the virtual machines 110, 112, the vGPU profile mechanism 114 may consolidate 350 the information describing the current usage of GPU resources for the physical GPUs 107 on each graphics board 104. For example, the vGPU profile mechanism 114 may determine a sum of the GPU resources currently being used by the virtual machines 110, 112 that have been allocated GPU resources from one or more physical GPUs 107 located on a single graphics board 104. In this example, the vGPU profile mechanism 114 may then determine the sum of the GPU resources currently being used for each additional graphics board 104 on each node 105 in the system 102 or for a cluster of nodes 105.

Figure 4A:
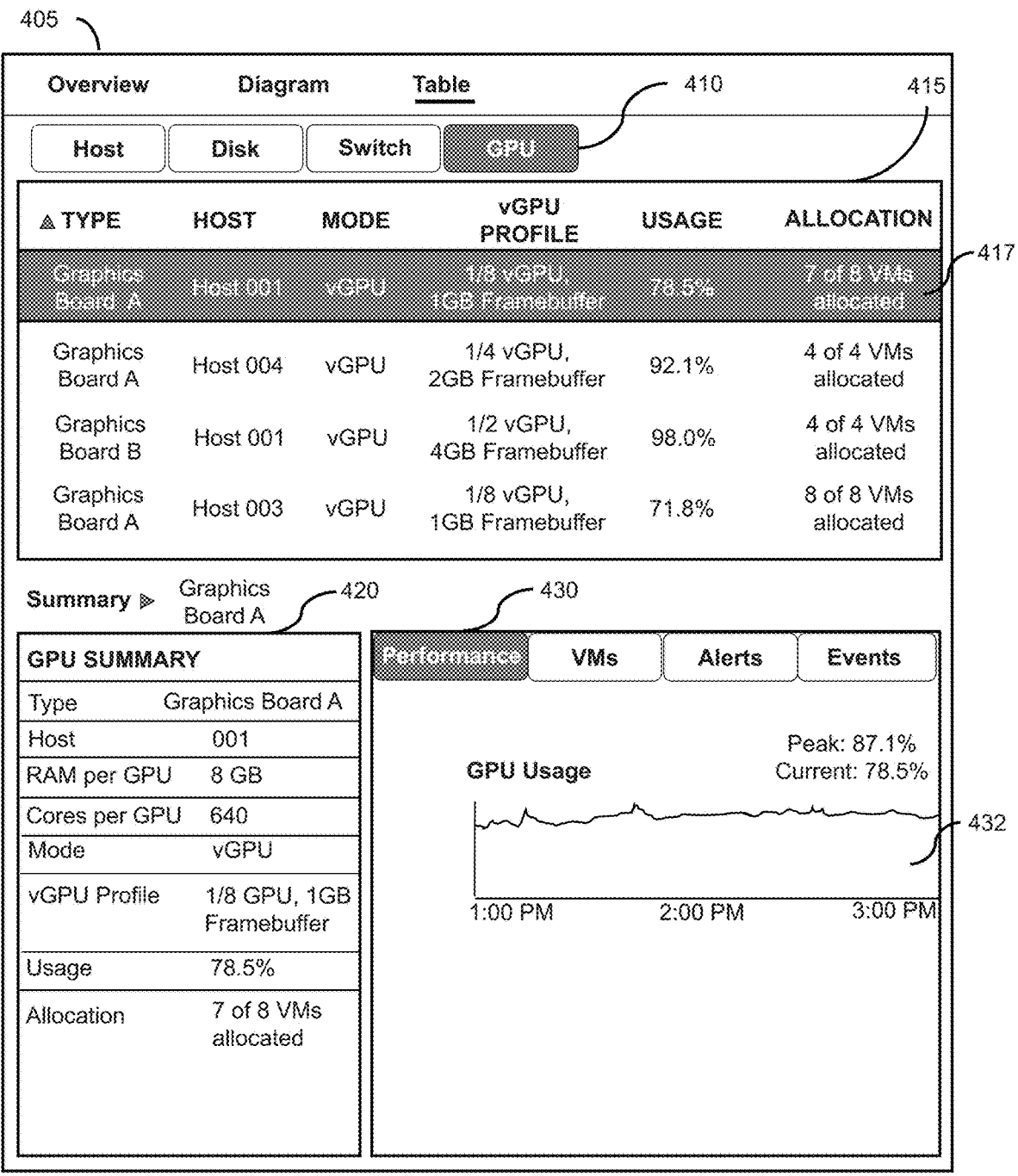
FIG. 4A illustrates an example user interface for presenting GPU resource-related gauge(s) for a graphics board on a node in a networked virtualization system according to some embodiments of the invention.

Once the vGPU profile mechanism 114 has consolidated 350 this information, the user interface engine 160 may generate 352 (e.g., via the vGPU mechanism 165) a user interface that describes the usage of GPU resources for each graphics board 104 and present 354 the user interface. For example, as shown in FIG. 4A, the user interface 405 may be presented in a dashboard that includes a table 415 that describes GPU resources 410 for multiple graphics boards 104 on multiple nodes 105. Each entry 417 in the table 415 may include information identifying a graphics board 104, a node 105 or host assigned to a vGPU profile 108 associated with the graphics board 104, the percentage of GPU resources of the graphics board 104 being utilized, and a ratio of virtual machines 110, 112 assigned or allocated to the vGPU profile 108.

Additionally, the user interface 405 may include interactive elements that allow the user interface engine 160 to receive inputs from a user and present additional information in response to the received inputs. For example, in FIG. 4A, the user interface 405 may also include information that is specific to an entry 417 selected from table 415, such as a summary table 420. The summary table 420 may include additional information that is not present in table 415, such as the number of cores per physical GPU 107. Also, in response to receiving an input indicating a request to view information describing a performance of the physical GPU 107 associated with the selected entry 417, (e.g., via button 430) the user interface 405 may include a vGPU gauge 432. The vGPU gauge 432 may be presented as a line graph that illustrates GPU resource usage and/or allocation as a function of time for the physical GPU 107 associated with the selected entry 417, as well as information indicating peak and current GPU resource usage.

Figure 4B:
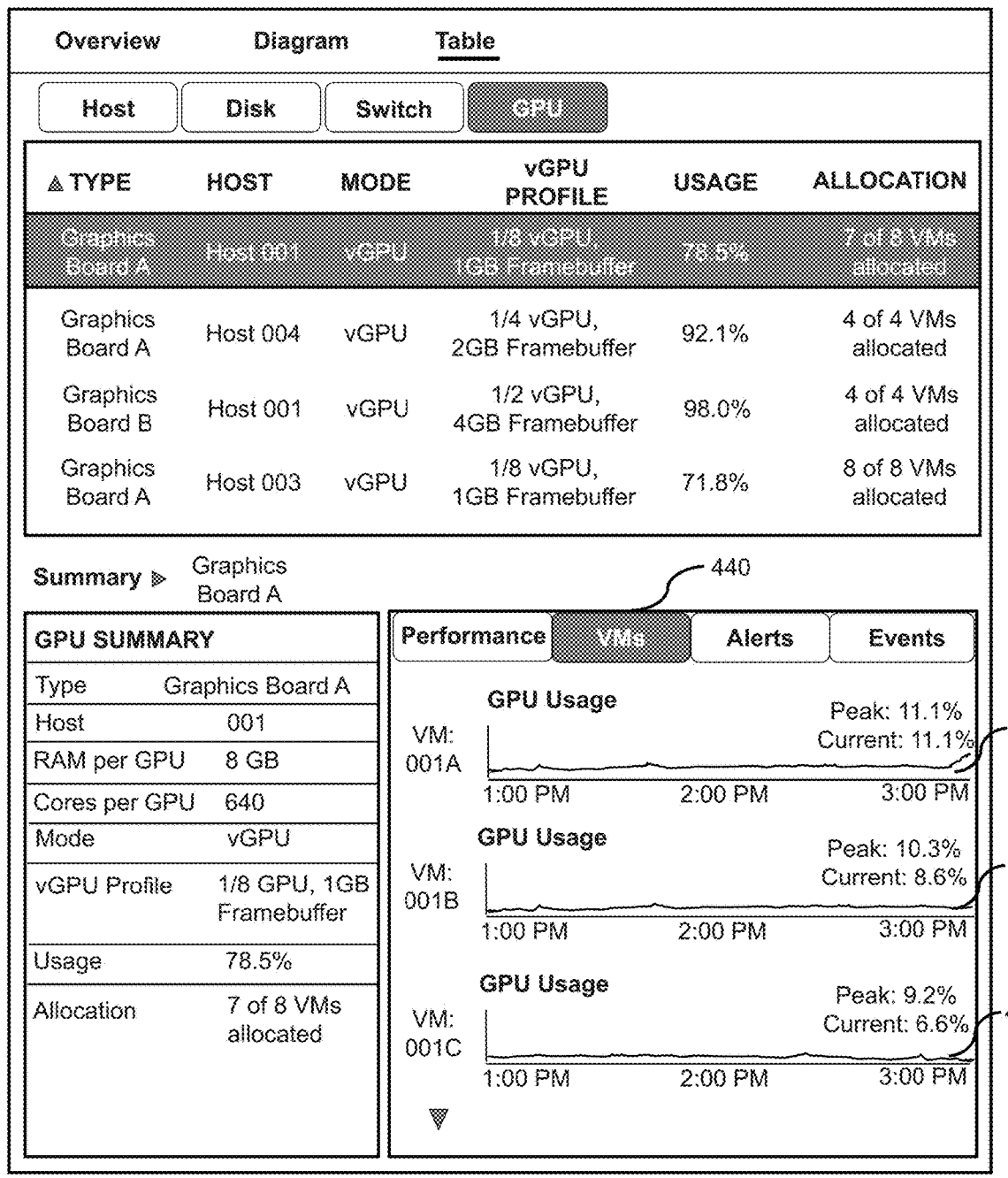
FIG. 4B illustrates an example user interface for presenting GPU resource-related gauge(s) for each virtual machine supported by each graphics board on a node in a networked virtualization system according to some embodiments of the invention.

Referring now to FIG. 3D, alternatively, after the vGPU profile mechanism 114 has retrieved 300, 302 information describing the initial allocation of GPU resources to the virtual machines 110, 112 and information describing the current usage of GPU resources by the virtual machines 110, 112, the vGPU profile mechanism 114 may generate 360 and present 362 a similar user interface for each virtual machine 110, 112. For example, as shown in FIG. 4B, in response to receiving an input indicating a request to view information describing virtual machines 110, 112 associated with the selected entry 417, (e.g., via button 440) the user interface 405 may include multiple vGPU gauges 442, 444, 446. Similar to FIG. 4A, these vGPU gauges 442, 444, 446 may be represented as line graphs that illustrate GPU resource usage and/or allocation as a function of time for each virtual machine 110, 112 associated with the selected entry 417, as well as information indicating peak and current GPU resource usage for each virtual machine 110, 112.

In various embodiments, the vGPU profile mechanism 114 may generate additional types of user interface elements that may be included in a user interface 405 presented in a display area of the management console 170. As shown in the example of FIG. 4C, in some embodiments, in response to receiving an input indicating a request to view information describing alerts associated with the selected entry 417, (e.g., via button 450) the user interface 405 may include information describing one or more alerts activated upon the detection of an event by the vGPU profile mechanism 114. In some embodiments, the user interface including the information describing the alert(s) is presented upon activation of the alert (e.g., in a pop-up window).

As shown in FIG. 4C, each alert is associated with a vGPU gauge 452, as well as in information below the gauge 454 describing the nature of the alert (e.g., usage of GPU resources by a virtual machine 110, 112 that has exceeded a threshold percentage of the GPU resources allocated to the virtual machine 110, 112) and the time at which the alert was activated. Furthermore, information describing an alert may include one or more interactive elements that allow a user to provide an input responsive to the alert. For example, portion 454 of the user interface 405 includes different buttons that allow a user to respond to the alert by selecting an action to reassign the virtual machine 110, 112 to a different vGPU profile 108 automatically (e.g., by the profile reassignment module 130) or manually. In this example, in response to receiving an input indicating a request to manually reassign the virtual machine 110, 112 to a different vGPU profile 108, the drop-down menus in portion 454 may also allow a system administrator or other user to reassign the virtual machine 110, 112 to a different vGPU profile 108 via the management console 170 on a different node 105 or host).

An additional type of user interface element that may be included in a user interface 405 presented in a display area of the management console 170 is shown in FIG. 4D. In some embodiments, in response to receiving an input indicating a request to view information describing events associated with the selected entry 417, (e.g., via button 460) the user interface 405 may include information describing one or more events detected by the vGPU profile mechanism 114 (e.g., reassignment of a virtual machine 110, 112 to a different vGPU profile 108, alerts activated, etc.). Similar to the alerts, each event may include details related to the event, such as a general description of the type of event, a time that the event occurred, and a detailed description of the event (e.g., the graphics boards 104 or virtual machines 110, 112 involved in the event) 462.

Although the information in the user interface 405 shown in FIGS. 4A-4D is presented via tables and line graphs, in various embodiments, the information may be presented in formats other than those depicted in FIGS. 4A-4D (e.g., diagrams, pie charts, bar graphs, etc.).

Figure 5A:
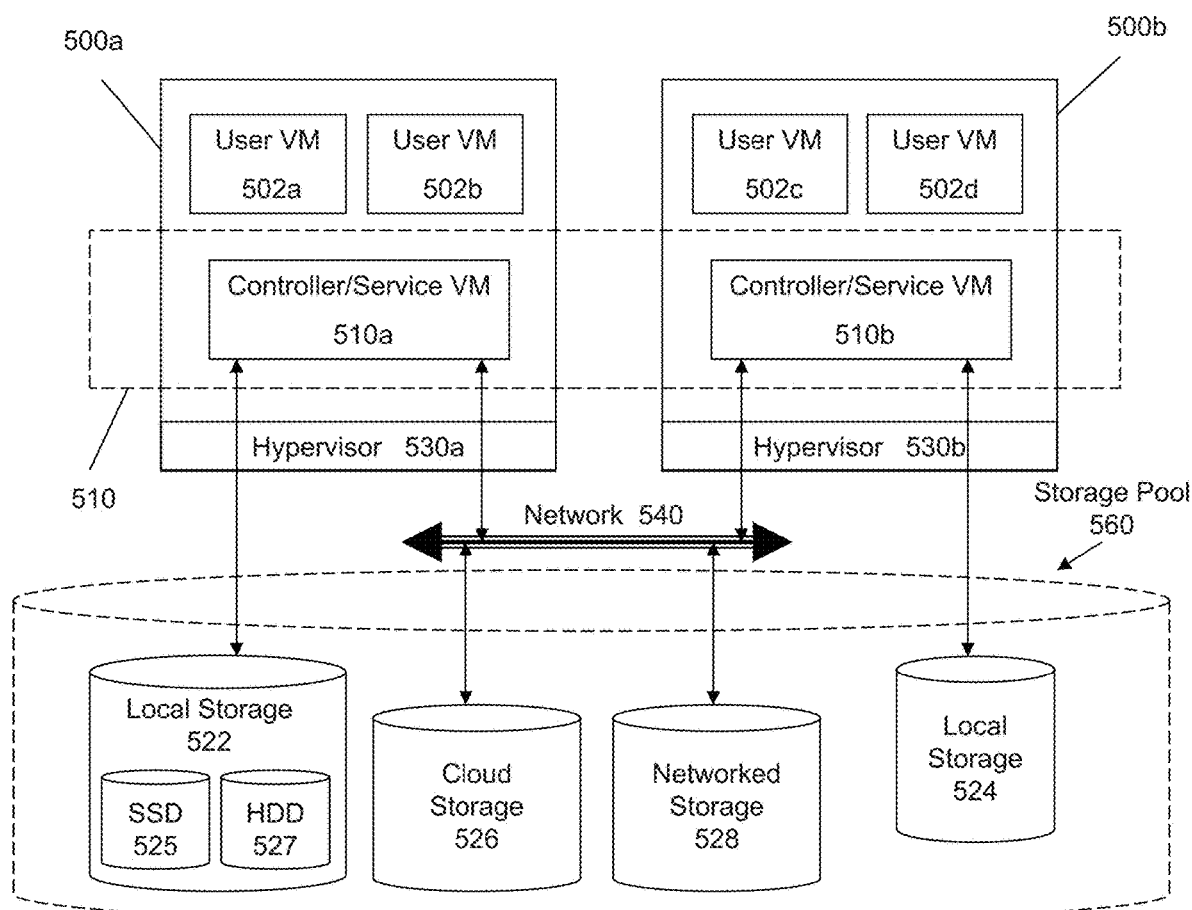
FIG. 5A illustrates an example networked virtualization system according to some embodiments of the invention.

FIG. 5A illustrates a clustered virtualization environment in which some embodiments are implemented. The vGPU profile mechanism 114 may operate in a clustered virtualization environment, such as via management console 170. Further, information about the cluster may be used as inputs to the vGPU profile mechanism 114.

The architecture of FIG. 5A can be implemented for a distributed platform that contains multiple servers 500*a* and 500*b* that manages multiple-tiers of storage. The multiple tiers of storage may include storage that is accessible through a network 540, such as cloud storage 526 or networked storage 528 (e.g., a SAN or "storage area network"). Unlike the prior art, the present embodiment also permits local storage 522/524 that is within or directly attached to the server and/or appliance to be managed as part of the storage pool 560. Examples of such storage include Solid State Drives (henceforth "SSDs") 525 or Hard Disk Drives (henceforth "HDDs" or "spindle drives") 527. These collected storage devices, both local and networked, form a storage pool 560. Virtual disks (or "vDisks") can be structured from the storage devices in the storage pool 560, as described in more detail below. As used herein, the term vDisk refers to the storage abstraction that is exposed by a Controller/Service VM to be used by a user VM. In some embodiments, the vDisk is exposed via iSCSI ("internet small computer system interface") or NFS ("network file system") and is mounted as a virtual disk on the user VM.

Each server 500*a* or 500*b* runs virtualization software, such as VMware ESX(i), Microsoft Hyper-V, or RedHat KVM. The virtualization software includes a hypervisor 530*a*/530*b* to manage the interactions between the underlying hardware and the one or more user VMs 502*a*, 502*b*, 502*c*, and 502*d* that run client software.

A special VM 510*a*/510*b* is used to manage storage and I/O activities according to some embodiment of the invention, which is referred to herein as a "Controller/Service VM". This is the "Storage Controller" in the currently described architecture. Multiple such storage controllers coordinate within a cluster to form a single system. The Controller/Service VMs 510*a*/510*b* are not formed as part of specific implementations of hypervisors 530*a*/530*b*. Instead, the Controller/Service VMs run as virtual machines above hypervisors 530*a*/530*b* on the various servers 500*a* and 500*b*, and work together to form a distributed system 510 that manages all the storage resources, including the locally attached storage 522/524, the networked storage 528, and the cloud storage 526. Since the Controller/Service VMs run above the hypervisors 530*a*/530*b*, this means that the current approach can be used and implemented within any virtual machine architecture, since the Controller/Service VMs of embodiments of the invention can be used in conjunction with any hypervisor from any virtualization vendor.

Each Controller/Service VM 510*a*-*b* exports one or more block devices or NFS server targets that appear as disks to the client VMs 502*a*-*d*. These disks are virtual, since they are implemented by the software running inside the Controller/Service VMs 510*a*-*b*. Thus, to the user VMs 502*a*-*d*, the Controller/Service VMs 510*a*-*b* appear to be exporting a clustered storage appliance that contains some disks. All user data (including the operating system) in the client VMs 502*a*-*d* resides on these virtual disks.

Significant performance advantages can be gained by allowing the virtualization system to access and utilize local (e.g., server-internal) storage 522 as disclosed herein. This is because I/O performance is typically much faster when performing access to local storage 522 as compared to performing access to networked storage 528 across a network 540. This faster performance for locally attached storage 522 can be increased even further by using certain types of optimized local storage devices, such as SSDs 525. Further details regarding methods and mechanisms for implementing the virtualization environment illustrated in FIG. 5A are described in U.S. Pat. No. 8,601,473, titled "ARCHITECTURE FOR MANAGING I/O AND STORAGE FOR A VIRTUALIZATION ENVIRONMENT", issued on Dec. 3, 2013, which is hereby incorporated by reference in its entirety.

Figure 5B:
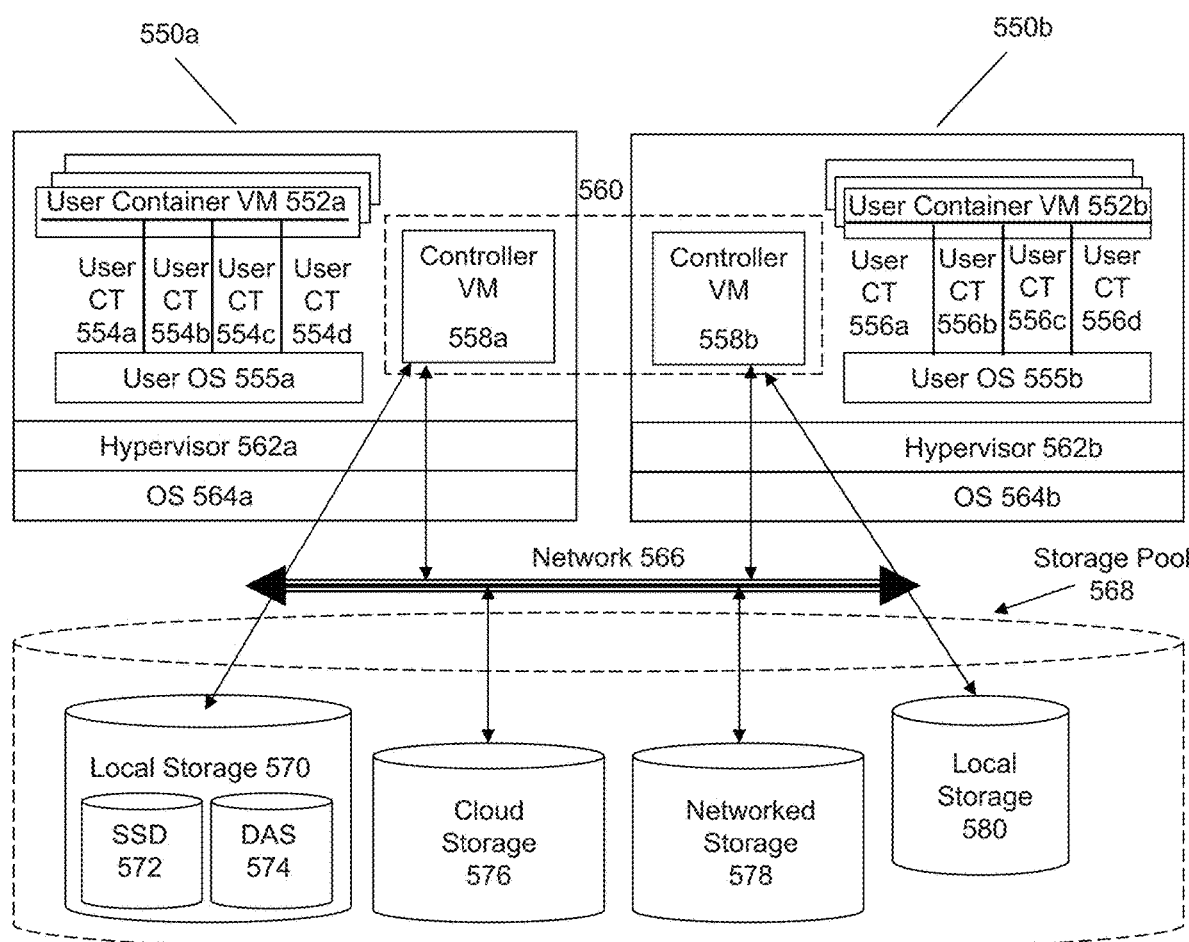
FIG. 5B illustrates an alternative example networked virtualization system according to some embodiments of the invention.

FIG. 5B illustrates an alternative approach for virtualized computing environments using containers. Generally, containers are a type of operating-system level application virtualization, in which the containers run applications in individual execution environments that are isolated from the host operating system and from each other. Some existing systems for running containerized applications include Linux LXC and Docker.

Containers running applications (e.g., containerized applications) have the benefit of being very fast to get up and running because no guest operating system must be installed for the application. The container may interface with the host computer or computers on a network through one or more virtualized network connections, which is managed by a container manager. For example, a web-server container may run a web-server application which is addressed by a IP addressed assigned to the container. To address or access the web-server container, a user or computer may use the IP address, which is intercepted by a container manager and routed to the container. Because the container is isolated from the host operating system, such as if the container application is compromised (e.g., hacked), the malicious entity doing the hacking will be trapped inside the container. However, to increase security, a containerized system may be implemented within a virtual machine. In this way, containerized applications can be quickly modified/updated within the container execution environment, and if one or more of the containers is breached, it will not affect the physical host computer because the container execution environment is still behind a virtual machine.

In FIG. 5B, an approach is illustrated for running containers within a distributed storage system, such as the system of FIG. 5A. Though FIG. 5B illustrates a particular architecture involving a controller virtual machine and user virtual machine which has user containers, one of ordinary skill in the art appreciates that other configurations may be implemented as well. Other approaches, and configurations are discussed in U.S. Application No. 62/171,990, titled "ARCHITECTURE FOR MANAGING I/O AND STORAGE FOR A VIRTUALIZATION ENVIRONMENT USING CONTAINERS AND VIRTUAL MACHINES", filed on Jun. 5, 2015, which is hereby incorporated by reference in its entirety.

In FIG. 5B, a distributed platform contains multiple servers 550*a* and 550*b* that manage multiple-tiers of storage. In some embodiments, the servers 550*a* and 550*b* are physical machines with hardware layer such as memory or processors (not depicted) upon which an operating system may be installed. The managed multiple tiers of storage include storage that is accessible through a network 566, such as cloud storage 576 or networked storage 578 (e.g., a SAN or "storage area network"). Additionally, the present embodiment also permits local storage 570 and/or 580 that is within or directly attached to the server and/or appliance to be managed as part of the storage pool 568. Examples of such storage include SSDs 572, HDDs, "spindle drives," or other types of local storage that is directly attached (e.g., direct attached storage, DAS 574). These storage devices, both local and networked, collectively form a storage pool 568. Virtual disks (or "vDisks") can be structured from the storage devices in the storage pool 568, as described in more detail below. As used herein, the term vDisk refers to the storage abstraction that is exposed by a controller/service VM to be used by a user VM or a user container (CT). In some embodiments, the vDisk is exposed via iSCSI ("internet small computer system interface") or NFS ("network file system") and is mounted as a virtual disk on the user VM.

Each server 550a or 550b runs virtualization software, such as VMware ESX(i), Microsoft Hyper-V, or RedHat KVM. The virtualization software includes a hypervisor 562a-b to manage the interactions between the underlying hardware and the one or more user CTs that run client software, such as containerized applications.

The servers 550a-b may implement virtual machines with an operating system 564a-b that supports containers (e.g., Linux) and VM software, such as hypervisors 562a-b. In particular, as illustrated in FIG. 5A for example, node or server 550a runs a controller VM 558a and a user container VM 552a that runs one or more containers 554a-d from a user OS 555a. Each of the user containers may run a container image that may be layered to appear as a single file-system for that container. For example, a base layer may correspond to a Linux Ubuntu image, with an application execution layer on top; the application execution layer corresponding to a read/write execution environment for applications, such as MySQL, web servers, databases or other applications.

In some embodiments, the controller virtual machines 558a-b are used to manage storage and I/O activities for the user containers 554a-d. The controller virtualized computer is the "Storage Controller" in the currently described architecture. Multiple such storage controllers coordinate within a cluster to form a single-system. The Controller VMs 558a-b are not formed as part of specific implementations of respective hypervisors 562a-b. Instead, each controller VM runs as a virtual machine above its respective hypervisors 562a-b on the various servers 550a and 550b, and work together to form a distributed system 560 that manages all the storage resources, including the locally attached storage 570/580 the networked storage 578, and the cloud storage 576.

Each controller VM 558a-b exports one or more block devices or NFS server targets that appear as disks to the user container VM 552a-b. These disks are virtual, since they are implemented by the software running inside the controller VMs 558a-b. Thus, to the User-Container VMs 552a-b, the controller VMs 558a-b appear to be exporting a clustered storage appliance that contains some disks. All user data (including the operating system) in the user-container VMs 552a-b resides on these virtual disks. The containers run from within the respective user container VMs 552a-b may use the user OSs 555a-b to run isolated containerized directories. Further, each user OS 555a-b may have a container manager installed (e.g., Docker, LXC) to run/manage containers on each respective user container VM 552a-b.

Significant performance advantages can be gained by allowing the virtualization system to access and utilize local (e.g., server-internal) storage 570 as disclosed herein. This is because I/O performance is typically much faster when performing access to local storage 570 as compared to performing access to networked storage 578 across a network 566. This faster performance for locally attached storage 570 can be increased even further by using certain types of optimized local storage devices, such as SSDs 572.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 570. On the other hand, data that does not require fast access or which is accessed infrequently can be stored in the networked storage devices 578 or in cloud storage 576. Further details regarding an exemplary approach for implementing the virtualization environment are described in U.S. Pat. No. 8,601,473, titled "ARCHITECTURE FOR MANAGING I/O AND STORAGE FOR A VIRTUALIZATION ENVIRONMENT", issued on Dec. 3, 2013, which is hereby incorporated by reference in its entirety.

In this way, the security and robustness of a distributed storage system using virtual machines (as illustrated in FIG. 5A) may be combined with efficiency and consistency of a container virtualized computer/application environment.

Figure 6:
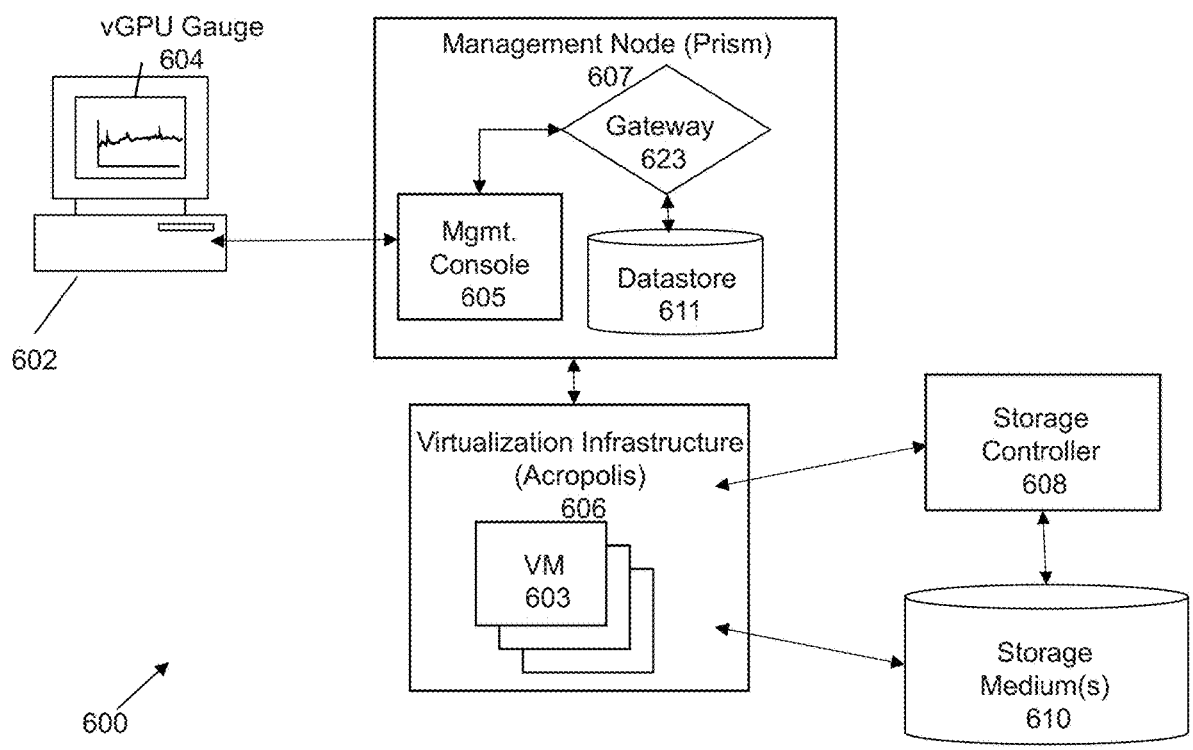
FIG. 6 illustrates a system to implement a virtualization management console according to some embodiments of the invention.

FIG. 6 illustrates a system 600 to implement a virtualization management console 605 according to some embodiments of the invention. In some embodiments, the vGPU profile mechanism 114 may operate in a virtualization management console, such as via a management console or on a cluster itself. Further, information for and about one or more clusters may be used as inputs to the vGPU profile mechanism 114 such that one or more clusters can be evaluated together.

The system 600 includes one or more users at one or more user stations 602 that use the system 600 to operate the virtualization system 600 and/or management console 605. The user station 602 comprises any type of computing station that may be used to operate or interface with the system 600. Examples of such user stations include, for example, workstations, personal computers, or remote computing terminals. The user station 602 comprises a display device, such as a display monitor, for displaying a user interface (e.g., vGPU gauge 604) to users at the user station. The user station 602 also comprises one or more input devices for the user to provide operational control over the activities of the system 600, such as a mouse or keyboard to manipulate a pointing object in a graphical user interface.

System 600 includes virtualization infrastructure 606, comprising any processing components necessary to implement and provision one or more VMs 603. For example, the virtualization infrastructure 606 may correspond to Nutanix Acropolis. This may include management components to obtain the status of, to configure, and/or to control the operation of one or more storage controllers and/or storage mediums 610. Data for the VMs 603 are stored in a tangible computer readable storage device 610. The computer readable storage device 610 comprises any combination of hardware and software that allows for ready access to the data that is located at the computer readable storage device 610. The storage controller 608 is used to manage the access and operation of the computer readable storage device 610. While the storage controller is shown as a separate component here, it is noted that any suitable storage controller configuration may be employed. For example, in some embodiments, the storage controller can be implemented as a virtual machine as described in more detail below. As noted in more detail below, the virtualization infrastructure 606 may correspond to a cluster of multiple nodes that are integrated as a single system.

System 600 includes a management console 605 included in a management node 607 (e.g., Nutanix Prism). The management console 605 provides an interface that permits an administrator to manage and administer the operation of the system. According to some embodiments, the management console 605 comprises a javascript program that is executed to display a management user interface within a web browser at the user station 602. In some embodiments, the storage controller exposes an API or GUI to create, read, update, delete (CRUD) data stores at the computer readable medium 610, which can be managed by the management console 605.

In operation in some embodiments, a web browser at the user station 602 is used to display a web-based user interface for the management console. The management console 605 corresponds to javascript code to implement the user interface. Metadata regarding the system 600 is maintained at a data store 611, which collects data relating to the virtualization infrastructure 606, the storage mediums 610, and/or datastores at the storage mediums. The javascript code interacts with a gateway 623 to obtain the metadata to be displayed in the user interface. In some embodiments, the gateway comprises a web server and servlet container, e.g., implemented using Apache Tomcat. Further details regarding methods and mechanisms for implementing virtualization management console illustrated in FIG. 6 are described in U.S. Provisional Patent Application No. 62/108,515, titled "ARCHITECTURE FOR IMPLEMENTING CENTRALIZED MANAGEMENT FOR A COMPUTING ENVIRONMENT", filed on Jan. 27, 2015, which is hereby incorporated by reference in its entirety.

Figure 7:
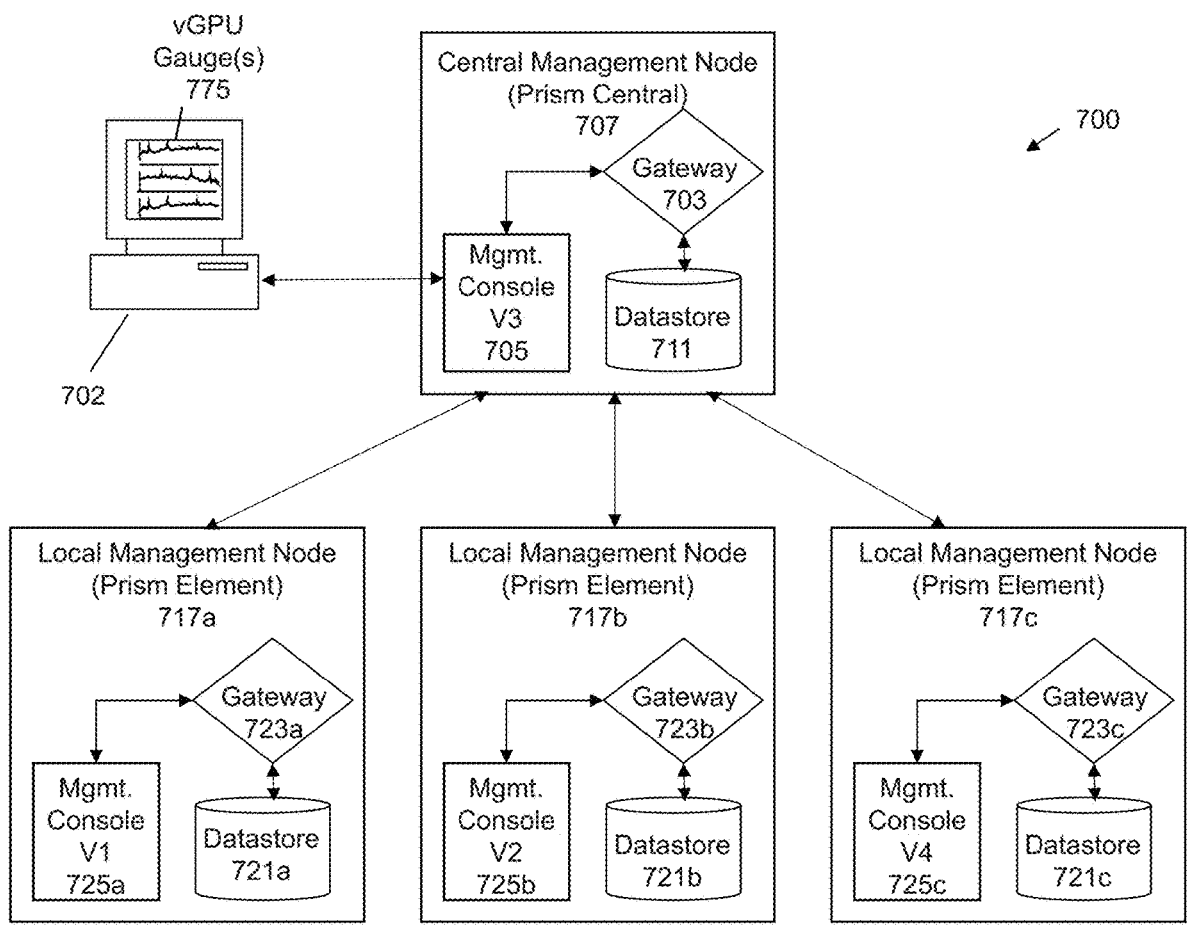
FIG. 7 illustrates a computing environment having multiple underlying systems/clusters to be managed, where a separate management node exists for each of the underlying systems/clusters.

FIG. 7 illustrates a larger computing environment having multiple underlying systems/clusters that need to be managed, where a separate management node exists for each of the underlying systems/clusters.

Similar to FIG. 6, the system 700 includes one or more users at one or more user stations 702 that use the system 700 to operate the virtualization system 700 and/or management console 705. The user station 702 comprises any type of computing station that may be used to operate or interface with the system 700 and a display device, such as a display monitor, for displaying a user interface (e.g., vGPU gauge(s) 775) to users at the user station. The user station 702 also comprises one or more input devices for the user to provide operational control over the activities of the system 700, as described above.

The vGPU profile mechanism 114 may reside on a central management node 707 for one or more clusters that includes its own management console 705, gateway 703, and datastore 711. Shown here are local management nodes 717a, 717b, and 717c. The central management node 707 and the local management nodes 717a, 717b, and 717c may correspond to Nutanix Prism Central and Nutanix Prism Element, respectively. Each of these management nodes includes its own management console 725a-c, gateway 723a-c, and datastore 721a-c. Further, information for and about one or more clusters may be used as inputs to the vGPU profile mechanism 114 such that one or more clusters can be evaluated individually, or all clusters may be evaluated as a whole with the potential of sharing GPU resources across multiple nodes. Further details regarding methods and mechanisms for implementing virtualization management console illustrated in FIG. 7 are described in U.S. Provisional Patent Application No. 62/108,515, titled "ARCHITECTURE FOR IMPLEMENTING CENTRALIZED MANAGEMENT FOR A COMPUTING ENVIRONMENT", filed on Jan. 27, 2015, which is hereby incorporated by reference in its entirety.

System Architecture

Figure 8:
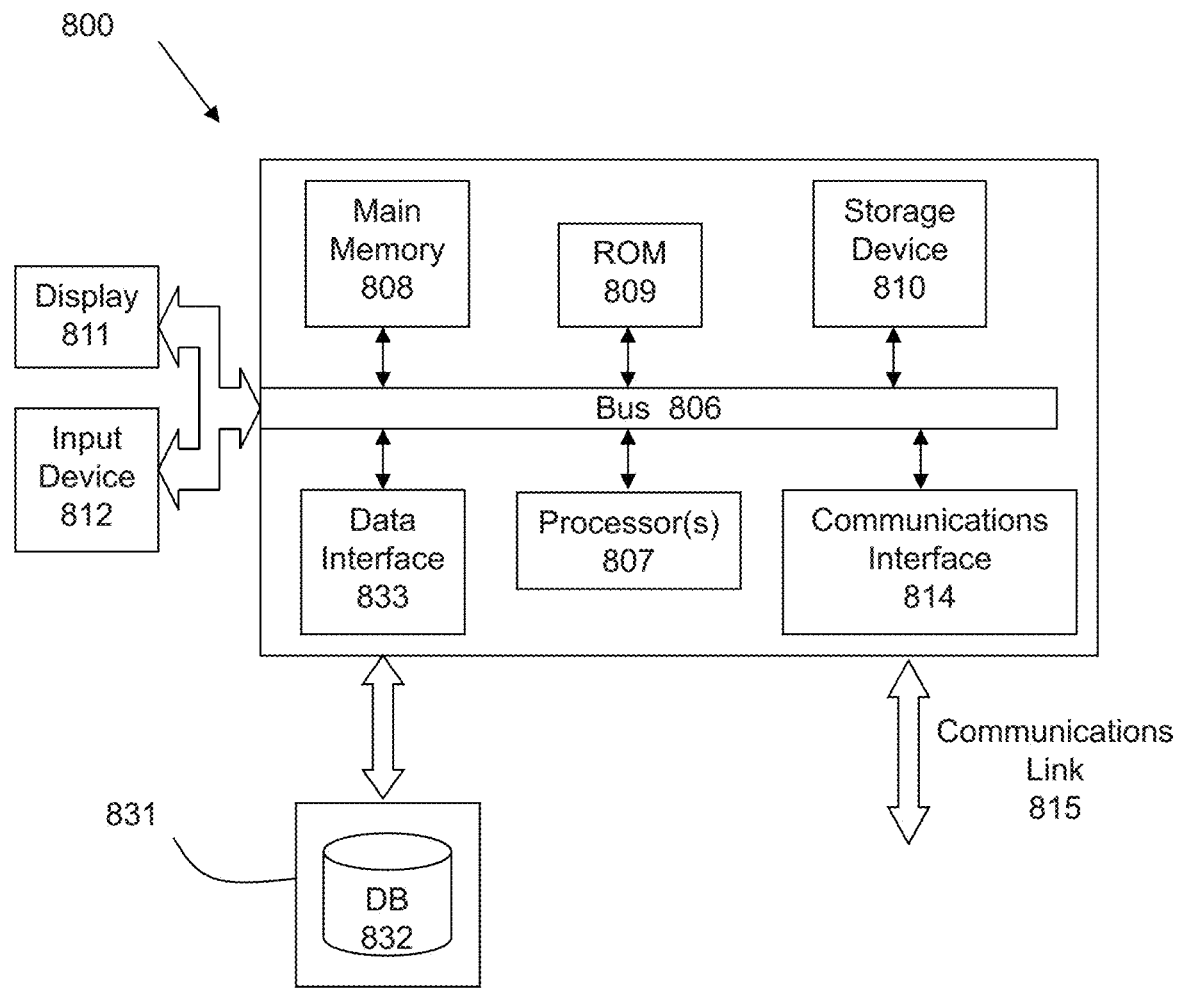
FIG. 8 is a block diagram of a computing system suitable for implementing an embodiment of the present invention.

FIG. 8 is a block diagram of an illustrative computing system 800 suitable for implementing an embodiment of the present invention. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to some embodiments of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 810 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. A database 832 in a storage medium 831 may be used to store data accessible by the system 800.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   receiving information describing a current allocation of a graphics processor resource to a virtual machine and a current usage of a graphics processor resource by the virtual machine, the current allocation corresponding to an assignment of the virtual machine to a first graphics processor profile of multiple graphics processor profiles, and respective graphics processor profiles of the multiple graphics processor profiles are associated with a respective user category;
   generating a comparison result by comparing the current usage of the graphics processor resource to the first graphics processor profile; and
   reallocating graphics processor resources by assigning the virtual machine to a second graphics processor profile of the multiple graphics processor profiles based on at least the comparison result and a determined category of user for the virtual machine that corresponds to the respective user category associated with the second graphics processor profile.

2. The method of claim 1, further comprising generating a user interface displaying a current usage of graphics processor resources and wherein a user interface displays a difference between a current allocation of graphics processor resources and a current usage of graphics processor resources.

3. The method of claim 1, wherein a current usage of graphics processor resources is displayed on a user interface for each of a plurality of virtual machines and the information describing a current usage of graphics processor resources by the plurality of virtual machines is retrieved via a set of API calls.

4. The method of claim 1, wherein a current usage of graphics processor resources is expressed as a ratio of virtual machines allocated to a first profile of a graphics processing unit.

5. The method of claim 1, further comprises comparing a workload of the virtual machine to a workload profile using a machine-learning model.

6. The method of claim 1, further comprising issuing an alert in response to determining that a current allocation of the graphics processor resource and the current usage of the graphics processor resource is within a threshold.

7. The method of claim 1, further comprising receiving a request to reallocate the graphics processor resources to the virtual machine.

8. The method of claim 1, further comprising migrating a workload from a first graphics processor associated with a first profile to a second graphics processor associated with a second profile.

9. A non-transitory computer readable medium having stored thereon a sequence of instructions which, when executed by a processor causes the processor to perform a set of acts comprising:
   receiving information describing a current allocation of a graphics processor resource to a virtual machine and a current usage of a graphics processor resource by the virtual machine, the current allocation corresponding to an assignment of the virtual machine to a first graphics processor profile of multiple graphics processor profiles, and respective graphics processor profiles of the multiple graphics processor profiles are associated with a respective user category;
   generating a comparison result by comparing the current usage of the graphics processor resource to the first graphics processor profile; and
   reallocating graphics processor resources by assigning the virtual machine to a second graphics processor profile of the multiple graphics processor profiles based on at least the comparison result and a determined category of user for the virtual machine that corresponds to the respective user category associated with the second graphics processor profile.

10. The computer readable medium of claim 9, the set of acts further comprise generating a user interface displaying a current usage of graphics processor resources and wherein a user interface displays a difference between a current allocation of graphics processor resources and a current usage of graphics processor resources.

11. The computer readable medium of claim 9, wherein a current usage of graphics processor resources is displayed on a user interface for each of a plurality of virtual machines and the information describing a current usage of graphics processor resources by the plurality of virtual machines is retrieved via a set of API calls.

12. The computer readable medium of claim 9, wherein a current usage of graphics processor resources is expressed as a ratio of virtual machines allocated to a first profile of a graphics processing unit.

13. The computer readable medium of claim 9, the set of acts further comprise migrating a workload from a first graphics processor associated with a first profile to a second graphics processor associated with a second profile.

14. The computer readable medium of claim 9, the set of acts further comprise comparing a workload of the virtual machine to a workload profile using a machine-learning model.

15. The computer readable medium of claim 9, the set of acts further comprise issuing an alert in response to determining that a current allocation of the graphics processor resource and the current usage of the graphics processor resource is within a threshold.

16. The computer readable medium of claim 9, the set of acts further comprising receiving a request to reallocate the graphics processor resources to the virtual machine.

17. A computer system comprising:
   a memory storing a sequence of instructions; and
   a processor that executes the sequence of instructions which causes the processor to perform a set of acts comprising:
      receiving information describing a current allocation of a graphics processor resource to a virtual machine and a current usage of a graphics processor resource by the virtual machine, the current allocation corresponding to an assignment of the virtual machine to a first graphics processor profile of multiple graphics processor profiles, and respective graphics processor profiles of the multiple graphics processor profiles are associated with a respective user category;

generating a comparison result by comparing the current usage of the graphics processor resource to the first graphics processor profile; and reallocating graphics processor resources by assigning the virtual machine to a second graphics processor profile of the multiple graphics processor profiles based on at least the comparison result and a determined category of user for the virtual machine that corresponds to the respective user category associated with the second graphics processor profile.

18. The computer system of claim 17, the set of acts further comprise generating a user interface displaying a current usage of graphics processor resources and wherein a user interface displays a difference between a current allocation of graphics processor resources and a current usage of graphics processor resources.

19. The computer system of claim 17, wherein a current usage of graphics processor resources is displayed on a user interface for each of a plurality of virtual machines and the information describing a current usage of graphics processor resources by the plurality of virtual machines is retrieved via a set of API calls.

20. The computer system of claim 17, wherein a current usage of graphics processor resources is expressed as a ratio of virtual machines allocated to a first profile of a graphics processing unit.

21. The computer system of claim 17, the set of acts further comprise migrating a workload from a first graphics processor associated with a first profile to a second graphics processor associated with a second profile.

22. The computer system of claim 17, the set of acts further comprise comparing a workload of the virtual machine to a workload profile using a machine-learning model.

23. The computer system of claim 17, the set of acts further comprise issuing an alert in response to determining that a current allocation of the graphics processor resource and the current usage of the graphics processor resource is within a threshold.

24. The computer system of claim 17, the set of acts further comprising receiving a request to reallocate the graphics processor resources to the virtual machine.

25. A non-transitory computer readable medium having stored thereon a sequence of instructions which, when executed by a processor causes the processor to perform a set of acts comprising:

retrieving information describing a current allocation of graphics processor resources to a plurality of virtual machines in a networked virtualization system, the current allocation corresponding to an assignment of at least one virtual machine of the plurality of virtual machines to a graphics processor profile;

retrieving information describing a current usage of the graphics processor resources by respective virtual machines of the plurality of virtual machines; and generating a user interface comprising a visual representation having a first portion describing different hosts being associated with a respective graphics processor profile and the current allocation of the graphics processor resources to the different hosts, and a second portion describing the current usage of the graphics processor resources for an entry that corresponds to a graphics processor profile selected in the first portion.

26. The computer readable medium of claim 25, wherein the visual representation describes a percentage of processor resources being utilized by the plurality of virtual machines, and the visual representation comprises a gauge.

27. The computer readable medium of claim 25, wherein the user interface includes information describing reassignments of processor resources.

28. The computer readable medium of claim 25, wherein the user interface is accessible by a user to interact with the processor remotely or via a local instance using a management console.

29. The computer readable medium of claim 25, wherein the user interface further comprises a difference between the current allocation of the graphics processor resources and the current usage of the graphics processor resources.

30. A method comprising:

retrieving information describing a current allocation of graphics processor resources to a plurality of virtual machines in a networked virtualization system, the current allocation corresponding to an assignment of at least one virtual machine of the plurality of virtual machines to a graphics processor profile;

retrieving information describing a current usage of the graphics processor resources by respective virtual machines of the plurality of virtual machines; and generating a user interface comprising a visual representation having a first portion describing different hosts being associated with a respective graphics processor profile and the current allocation of the graphics processor resources to the different hosts, and a second portion describing the current usage of the graphics processor resources for an entry that corresponds to a graphics processor profile selected in the first portion.

31. The method of claim 30, wherein the visual representation describes a percentage of processor resources being utilized by the plurality of virtual machines, and the visual representation comprises a gauge.

32. The method of claim 30, wherein the user interface includes information describing reassignments of processor resources.

33. The method of claim 30, wherein the user interface is accessible by a user to interact with the processor remotely or via a local instance using a management console.

34. The method of claim 30, wherein the user interface further comprises a difference between the current allocation of the graphics processor resources and the current usage of the graphics processor resources.

35. A computer system comprising:

a memory storing a sequence of instructions; and a processor that executes the sequence of instructions which causes the processor to perform a set of acts comprising:

retrieving information describing a current allocation of graphics processor resources to a plurality of virtual machines in a networked virtualization system, the current allocation corresponding to an assignment of at least one virtual machine of the plurality of virtual machines to a graphics processor profile;

retrieving information describing a current usage of the graphics processor resources by respective virtual machines of the plurality of virtual machines; and generating a user interface comprising a visual representation having a first portion describing different hosts being associated with a respective graphics processor profile and the current allocation of the graphics processor resources to the different hosts, and a second portion describing the current usage of the graphics processor resources for an entry that corresponds to a graphics processor profile selected in the first portion.

36. The computer system of claim 35, wherein the visual representation describes a percentage of processor resources being utilized by the plurality of virtual machines, and the visual representation comprises a gauge.

37. The computer system of claim 35, wherein the user interface includes information describing reassignments of processor resources.

38. The computer system of claim 35, wherein the user interface is accessible by a user to interact with the processor remotely or via a local instance using a management console.

39. The computer system of claim 35, wherein the user interface further comprises a difference between the current allocation of the graphics processor resources and the current usage of the graphics processor resources.

* * * * *